United States Patent
Lindholm et al.

(10) Patent No.: US 8,108,872 B1
(45) Date of Patent: Jan. 31, 2012

(54) THREAD-TYPE-BASED RESOURCE ALLOCATION IN A MULTITHREADED PROCESSOR

(75) Inventors: John Erik Lindholm, Saratoga, CA (US); Bryon S. Nordquist, Santa Clara, CA (US); Simon S. Moy, Los Altos, CA (US); Svetoslav D. Tzvetkov, Irvine, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1469 days.

(21) Appl. No.: 11/552,109

(22) Filed: Oct. 23, 2006

(51) Int. Cl.
*G06F 9/46* (2006.01)
(52) U.S. Cl. .................................................. 718/104
(58) Field of Classification Search .................. None
See application file for complete search history.

(56) References Cited

U.S. PATENT DOCUMENTS

| | | | |
|---|---|---|---|
| 5,020,115 A | 5/1991 | Black | |
| 5,608,586 A | 3/1997 | Sri-Jayantha et al. | |
| 5,969,726 A | 10/1999 | Rentschler et al. | |
| 6,630,935 B1 | 10/2003 | Taylor et al. | |
| 6,731,289 B1 | 5/2004 | Peercy et al. | |
| 7,805,726 B1 * | 9/2010 | Leonard et al. | 718/104 |
| 2002/0174318 A1 | 11/2002 | Stuttard et al. | |
| 2003/0041173 A1 | 2/2003 | Hoyle | |

OTHER PUBLICATIONS

Notice of allowance from U.S. Appl. No. 11/552,113, Oct. 28, 2011.

* cited by examiner

*Primary Examiner* — Meng An
*Assistant Examiner* — Eric Wai
(74) *Attorney, Agent, or Firm* — Kilpatrick Townsend & Stockton LLP

(57) ABSTRACT

Resources to be used by concurrent threads in a multithreaded processor are allocated based on thread types of the threads. For each of at least two thread types, an amount of the resource is reserved, and amounts currently allocated are tracked. When a request to allocate some of the resource to a new thread is received, a determination as to whether the allocation can be made is based on the thread type of the new thread, the amount of the resource reserved for that thread type, and the amount currently allocated to threads of that type.

18 Claims, 14 Drawing Sheets

THREAD-TYPE-BASED RESOURCE ALLOCATION IN A MULTITHREADED PROCESSOR

CROSS-REFERENCES TO RELATED APPLICATIONS

The present disclosure is related to the following U.S. Patents: U.S. Pat. No. 7,038,685, issued May 2, 2006, U.S. Pat. No. 7,447,873, issued Nov. 4, 2008, and U.S. Pat. No. 7,038,686, issued May 2, 2006. The respective disclosures of these applications are incorporated herein by reference for all purposes.

BACKGROUND OF THE INVENTION

The present invention relates generally to multithreaded processors and in particular to thread-type-based resource allocation in a multithreaded processor.

Multithreaded processors are known in the art. Such processors can manage multiple concurrent processing tasks, or "threads." A thread can be a unit of processing work of any size, and processors can create and terminate threads at various times. Between creation and termination, the thread's state is maintained within the processor, even at times when the processor is not actively executing the thread, allowing the processor to switch back and forth among multiple threads, creating a higher apparent degree of parallelism than the processor hardware actually supports.

Graphics processors benefit greatly from multithreading. As is known in the art, computer-based rendering generally involves performing the same operations repeatedly on different input data. For instance, a scene to be rendered may be defined in terms of a large number of primitives (e.g., points, lines, simple polygons) in a three-dimensional space. The vertices of each primitive are transformed to a viewing space, and the primitive is "rasterized" to determine which pixels in the image plane that primitive covers. Thereafter, each pixel is shaded based on the primitive(s) that cover it. Vertex transformations generally entail performing the same computations on each vertex of each primitive, and pixel shading also usually involves computations that are repeated for multiple pixels and/or multiple primitives. Since each vertex is processed independently of each other vertex, a thread can be defined for each vertex to be processed. Similarly, since each pixel is processed independently, a thread can be defined for each pixel to be processed. A multithreaded graphics processor can process vertex (or pixel) threads in any order, with any number of threads being processed in parallel.

Vertex transformation and pixel shading are usually very different operations that demand different amounts of processing resources. Traditionally, graphics processors include separate hardware sections dedicated to vertex and pixel processing, with each section being optimized for one or the other type of thread. More recently, graphics processors in which at least some processing resources are shared between vertex threads and pixel threads have been proposed. Because the relative demand for vertex and pixel processing varies from application to application, allowing hardware resources to be redirected to pixel or vertex processing as needed should improve overall efficiency.

In a shared-resource graphics processor, pixel threads and vertex threads compete for a limited supply of various processing resources. If too much of a resource is devoted to vertex processing and too little to pixel processing, the pixel stage of the rendering pipeline will tend to back up, slowing image generation to possibly unacceptable rates. Eventually, the backpressure can also stall vertex processing and lead to idle cycles in the graphics processor. Conversely, if too much of a resource is devoted to pixel processing and too little to vertex processing, the pixel stage of the pipeline could become starved for input data, again leading to idle cycles in the graphics processor. For many current graphics applications, the fraction of processing work devoted to vertex processing is relatively small, so more resources should be devoted to pixel processing than to vertex processing. Devoting too much of a resource to pixel processing, however, can lead to bubbles in the pipeline.

For optimal performance, it is desirable to keep the graphics processor fully busy most (ideally all) of the time. Accordingly, it is desirable to prevent too much of any resource from being devoted to one type of thread at the expense of another.

BRIEF SUMMARY OF THE INVENTION

Embodiments of the present invention provide systems and methods for allocating resources to be used by concurrent threads in a multithreaded processor based on thread types of the threads. For each of at least two thread types, an amount of the resource is reserved, and amounts currently allocated are tracked. When a request to allocate some of the resource to a new thread is received, a determination as to whether the allocation can be made is based on the thread type of the new thread, the amount of the resource reserved for that thread type, and the amount currently allocated to threads of that type. In some embodiments, by controlling and/or dynamically adjusting the amount of the resource reserved for threads of each thread type, the processing load can be balanced across the thread types so as to optimize throughput of the multithreaded processor.

According to one aspect of the present invention, a method is provided for allocating a shared resource in a multithreaded processor that concurrently executes a number of threads, each thread being of one or another of a number of thread types. A first amount and a second amount of a shared resource are reserved, respectively, for allocation to threads of a first one and a second one of the thread types. For each of the first and second thread types, an amount of the shared resource currently allocated to threads of that type is tracked. A request to allocate a first target amount of the shared resource to a first new thread, where the first new thread is of the first thread type, is received. Based at least in part on the first reserved amount and the amount of the shared resource currently allocated to threads of the first thread type, it is determined whether the first target amount of the shared resource is available for allocation to the first new thread. In the event that the first target amount of the shared resource is available, the first target amount of the shared resource is allocated to the first new thread.

If a request to allocate a second target amount of the resource to a second new thread, where the second new thread is of the second thread type, is received, such a request can be handled similarly. Based at least in part on the second reserved amount and the amount of the shared resource currently allocated to threads of the second thread type, it can be determined whether the second target amount of the shared resource is available for allocation to the second new thread. In the event that the second target amount of the shared resource is available, the second target amount of the requested resource is advantageously allocated to the second new thread. It should be noted that the first target amount and the second target amount can be different amounts that may be determined, e.g., based on thread type.

Any shared resource can be allocated in this manner. For instance, in one embodiment, the shared resource is a pool of context identifiers, where a different context identifier is assigned to each of the concurrently active threads in the processor. In another embodiment, the shared resource is a pool of entries in a local register file usable as thread-specific scratch space during execution of the concurrently active threads.

In some embodiments, the thread types include a pixel-shader type (for processing pixel data), a vertex shader type (for processing vertex data), and/or a geometry shader type (for processing geometry shader data).

In some embodiments, to reserve the first amount and the second amount of the shared resource, the resource is partitioned into at least a first section associated with the first thread type and a second section associated with the second thread type. The determination as to whether the first target amount of the shared resource is available may include determining whether the first target amount of the shared resource is available within the first section.

In other embodiments, the resource is not partitioned. Determining whether the first target amount of the shared resource is available can include determining whether increasing the amount of the shared resource currently allocated to threads of the first thread type by the first target amount would result in the currently allocated amount exceeding the first reserved amount.

According to another aspect of the present invention, a multithreaded processor includes a core, a resource allocation table, and resource allocation logic. The core is adapted to execute multiple threads concurrently, where each thread has a thread type. Each concurrently executing thread is allocated a portion of a shared resource. The resource allocation table is adapted to store allocation information for the shared resource. The allocation information includes, for each portion of the shared resource that is currently allocated to a thread, information identifying the thread type of the thread to which the portion is allocated. The resource allocation logic, which is coupled to the resource allocation table, is adapted to determine whether a target amount of the shared resource is available for allocation to a new thread of a first one of the thread types. The determination is based at least in part on the allocation information in the resource allocation table and apportionment information specifying an amount of the shared resource that is reserved for threads of the first thread type.

In some embodiments, the apportionment information specifies an upper limit on an amount of the shared resource that is available to threads of the first thread type. The resource allocation logic in one such embodiment includes a counter, a comparison circuit, and a decision logic circuit. The counter is adapted to generate a count of threads of a first thread type for which a portion of the shared resource is currently allocated. The comparison circuit is coupled to the counter and is adapted to compare the count generated by the counter to the upper limit. The decision logic circuit is adapted to determine, based on the comparison, whether an additional allocation to a thread of the first thread type would result in the count exceeding the upper limit. The decision logic circuit can also be adapted to make an allocation to a new thread of the first thread type only in the event that an additional allocation to a thread of the first thread type would not result in the count exceeding the upper limit.

In other embodiments, the apportionment information includes boundary information dividing the shared resource into at least a first section reserved for threads of the first thread type and a second section reserved for threads of a second one of the thread types. The resource allocation logic in one such embodiment is adapted to determine whether to make an allocation for a new thread of the first thread type based on whether an amount of the shared resource required by the new thread is available in the first section of the shared resource.

The following detailed description together with the accompanying drawings will provide a better understanding of the nature and advantages of the present invention.

DETAILED DESCRIPTION OF THE INVENTION

Embodiments of the present invention provide systems and methods for allocating resources to be used by concurrent threads in a multithreaded processor based on thread types of the threads. For each of at least two thread types, an amount of the resource is reserved, and amounts currently allocated are tracked. When a request to allocate some of the resource to a new thread is received, a determination as to whether the allocation can be made is based on the thread type of the new thread, the amount of the resource reserved for that thread type, and the amount currently allocated to threads of that type. In some embodiments, by controlling and/or dynamically adjusting the amount of the resource reserved for threads of each thread type, the processing load can be balanced across the thread types so as to optimize throughput of the multithreaded processor.

System Overview

Figure 1:
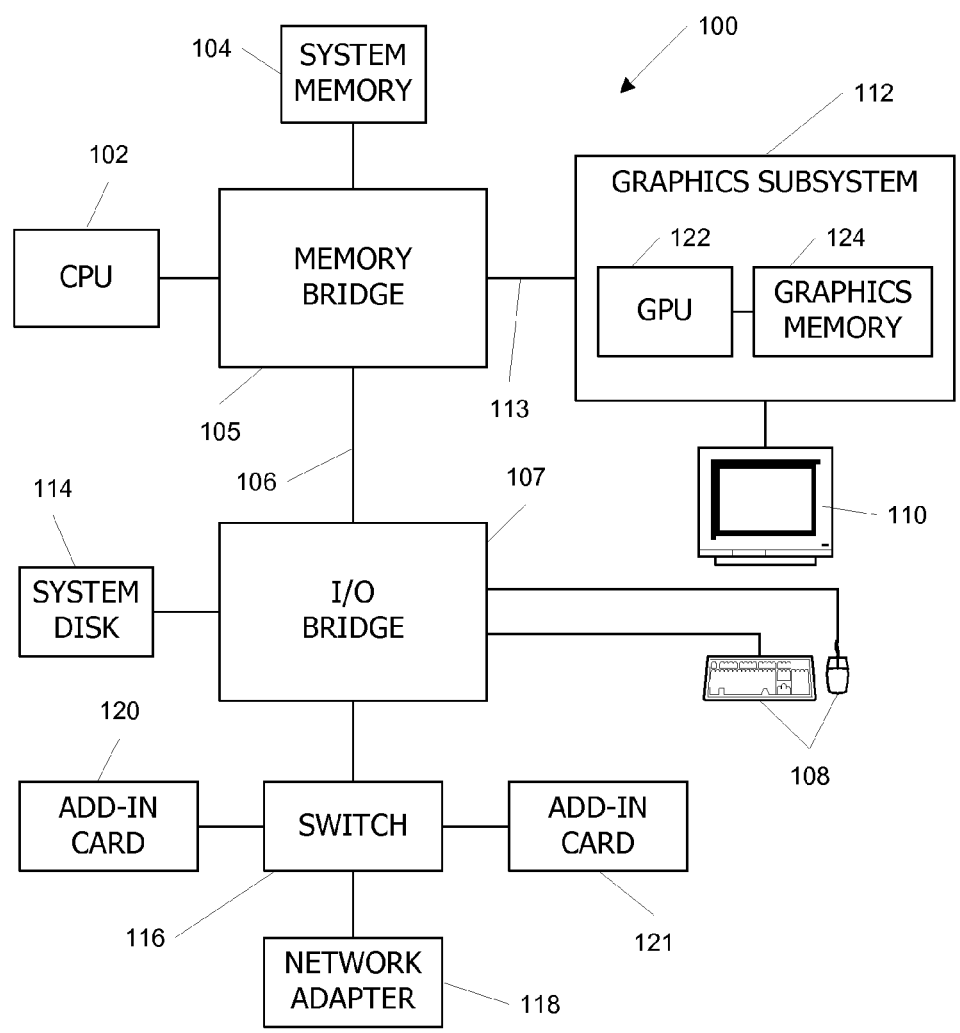
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a Hyper-Transport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Multithreaded Processor Overview

Figure 2:
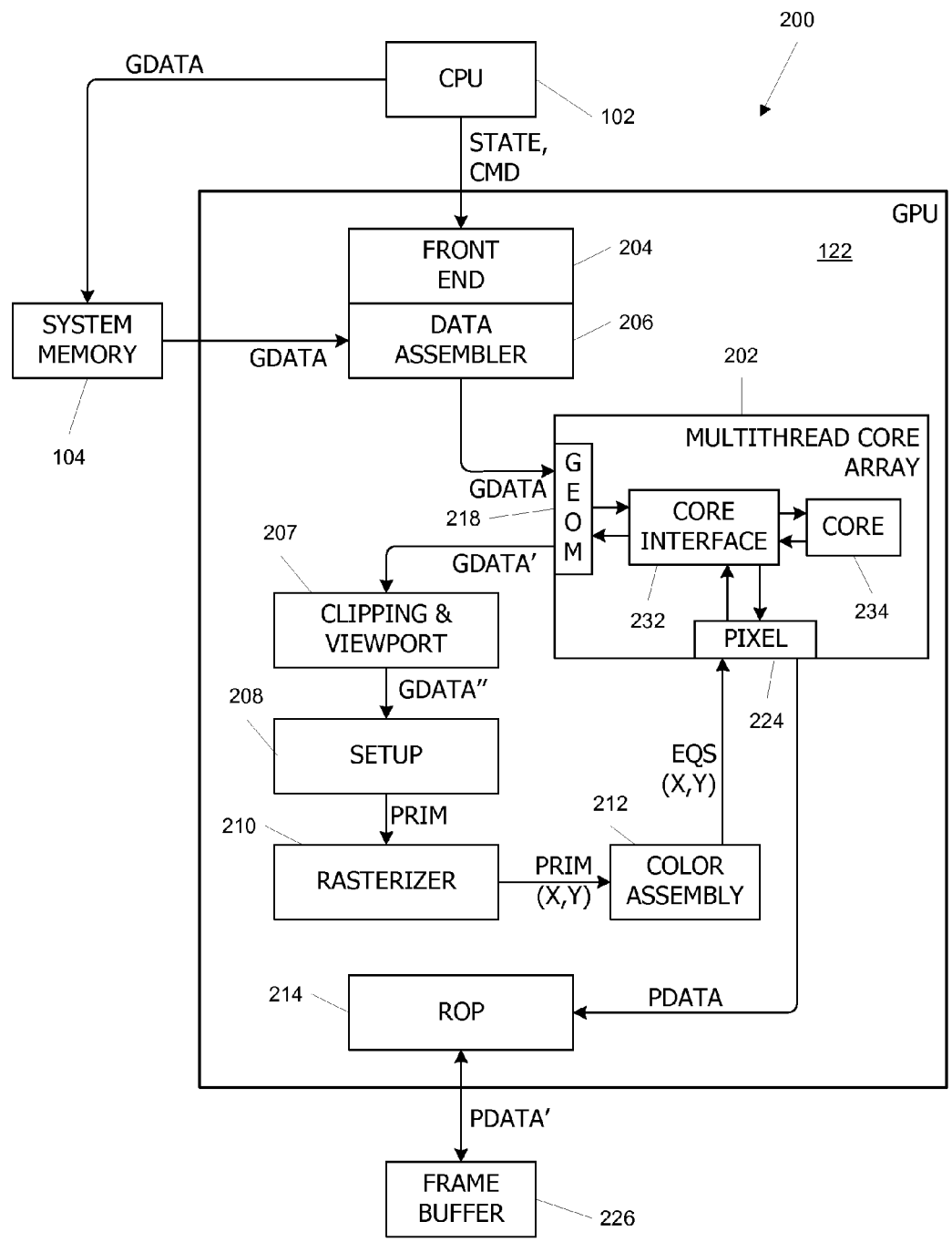
FIG. 2 is a block diagram of a rendering pipeline that can be implemented in a graphics processor according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202.

Multithreaded core array 202 in some embodiments provides a highly parallel architecture that supports concurrent execution of a large number of instances of vertex, geometry, and/or pixel shader programs in various combinations. Multithreaded core array 202 advantageously includes one or more "processing clusters," each of which includes a core interface 232 and at least one core 234. While one core interface 232 and one core 234 are shown, it is to be understood that a core array 202 may include any number (e.g., 1, 2, 4, 8, etc.) of core interfaces 232, and each core interface 232 may be coupled to control any number (e.g., 1, 2, 4, etc.) of cores 234.

Each core 234 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and/or pixel threads. An example architecture for a representative core 234 is described below with reference to FIG. 3.

In some embodiments, each core interface 232 also manages other resources that are shared among the cores 234 coupled thereto. For example, core interface 232 may also control a texture pipeline (not explicitly shown) that is shared among cores 234; when a core 234 encounters a texture instruction in one of its threads, it transmits a texture request to the texture pipeline via core interface 232. The texture pipeline processes the texture instruction and returns the result to the requesting core 234 via core interface 232. Texture processing by the shared pipeline may consume a significant number of clock cycles, and while a thread is waiting for the texture result, core 234 advantageously continues to execute other threads.

In addition to multithreaded core array 202, rendering pipeline 200 includes a front end 204 and data assembler 206, a clipping and viewport module 207, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry controller 218 in multithreaded core array 202.

Geometry controller 218 directs one or more cores 234 in multithreaded core array 202 to execute vertex and/or geometry shader programs on the vertex data, with the programs being selected in response to the state information provided by front end 204. As used herein, a "vertex shader" program refers generally to any sequence of processing instructions that operates on a vertex provided as part of scene data; vertex shader programs may perform coordinate transformations, lighting and shading effects, procedural geometry, animation, and/or other operations. A "geometry shader" program refers generally to any sequence of processing instructions that operates on a primitive or group of vertices rather than a single vertex; geometry shader programs may create new vertices, eliminate vertices or entire primitives, and so on. Particular vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art.

While some embodiments of the invention support both vertex shaders and geometry shaders, it is to be understood that this is not required.

In one embodiment, geometry controller 218 forwards the received data to core interface 232, which loads the vertex data into a core 234, then instructs that core 234 to launch the appropriate vertex shader program. Upon completion of the vertex shader program, core interface 232 signals geometry controller 218. If a geometry shader program is to be executed, geometry controller 218 instructs core interface 232 to launch the geometry shader program. In some embodiments, the processed vertex data is returned to geometry controller 218 upon completion of the vertex shader program, and geometry controller 218 instructs core interface 232 to reload the data (e.g., into a different core 234) before executing the geometry shader program. In other embodiments, vertex shader and/or geometry shader programs can be executed in multiple passes, with different processing operations being performed during each pass, and vertex passes can be alternated with geometry passes. Each vertex and/or geometry shader program determines the number of passes and the operations to be performed during each pass.

In some embodiments with multiple cores 234, geometry controller 218 determines which core 234 will execute each instance of a vertex shader and/or geometry shader program (i.e., each vertex or geometry thread). For instance, some cores 234 may be assigned only vertex shader programs while other cores 234 are assigned only geometry shader programs so that vertex and geometry shaders do not execute in the same core 234. This, however, is not required, and geometry controller 218 may direct any vertex and/or geometry threads to any core 234. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to clipping and viewport module 207. Clipping and viewport module 207, which may be of generally conventional design, performs clipping (including, e.g., near-plane and/or view frustum clipping) and viewport transformations. In some embodiments, clipping and viewport transformation may be handled in vertex shader and/or geometry shader programs, and clipping and viewport module 207 could be omitted. After clipping and viewport transformation, the transformed data (GDATA") is passed to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" refers generally to a region in 2-D screen space for which a single color value is to be determined; the number and arrangement of pixels can be a configurable parameter of rendering pipeline 200 and might or might not be correlated with the screen resolution of a particular display device.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space. These attribute equations are advantageously usable in a pixel shader program to interpolate a value for the attribute at any location within the primitive; conventional techniques can be used to generate the equations.

Color assembly module 212 provides the attribute equations (EQS), for each primitive that covers at least one sampling location of a pixel and a list of screen coordinates (X,Y) of the covered pixels to a pixel controller 224 in multithreaded core array 202.

Pixel controller 224 directs one or more cores 234 in multithreaded core array 202 to execute one or more pixel shader programs on each pixel covered by the primitive, with the program(s) being selected in response to the state information provided by front end 204. As used herein, a "pixel shader" program refers generally to any sequence of processing instructions that takes as input a portion (fragment) of a primitive that covers a well-defined screen area (pixel); pixel shader programs may implement a variety of visual effects, including lighting and shading effects, reflections, texture blending, procedural texture generation, antialiasing, and so on. Particular pixel shader programs can be specified by the rendering application as is known in the art, and different shader programs can be applied to different pixels and/or fragments. The shader program(s) to be used can be stored in system memory or graphics memory and identified to multithreaded core array 202 via suitable rendering commands and state information as is known in the art.

In one embodiment, pixel controller 224 forwards the received data to core interface 232, which loads the data (including coordinates of the covered pixels and attributes of the primitive or fragment) into a core 234, then instructs that core 234 to launch the appropriate pixel shader program. Upon completion of the pixel shader program, core interface 232 signals pixel controller 224 to retrieve the output data.

In some embodiments with multiple cores or multiple core interfaces, color assembly module 212 or pixel controller 224 divides the incoming stream of coverage data into portions and selects, e.g., based on availability of execution resources or the location of the primitive in screen coordinates, which of core interfaces 232 (or cores 234) is to receive the next portion of the data. That portion is delivered to the selected core interface 232.

Pixel shader programs are advantageously executed in the same cores 234 that also execute the vertex and/or geometry shader programs. Cores 234 are advantageously multithreaded, allowing pixel shader threads, vertex shader threads, and/or geometry shader threads to be executed concurrently. Switching between execution of different threads or different thread types in core 234 advantageously incurs little or no overhead so that, for instance, on one clock cycle, a given core 234 might execute a vertex shader program instruction, on the next clock cycle a pixel shader program instruction, and so on. Processing resources in core 234 are advantageously shared between pixel-shader threads, geometry-shader threads, and/or vertex-shader threads so as to balance throughput between the geometry and pixel stages of pipeline 200. Examples of suitable resource-sharing techniques are described below.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. In some embodiments, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module may jointly control a different subset of the cores and/or core interfaces in multithreaded core array 202.

The multithreaded core array may include any number of processing clusters, each with its own core interface, and each core interface may manage any number of cores. In some embodiments, shaders of certain types may be restricted to executing in certain processing clusters or in certain cores; for instance, if a processing cluster includes two cores, geometry shaders might be restricted to executing in one of the two cores of the processing cluster while vertex shaders are restricted to executing in the other of the two cores. Such design choices may be driven by considerations of hardware size and complexity versus performance, as is known in the art.

Where the multithreaded core array includes multiple processing clusters, data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

In some embodiments the multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Example Multithreaded Processing Core

Figure 3:
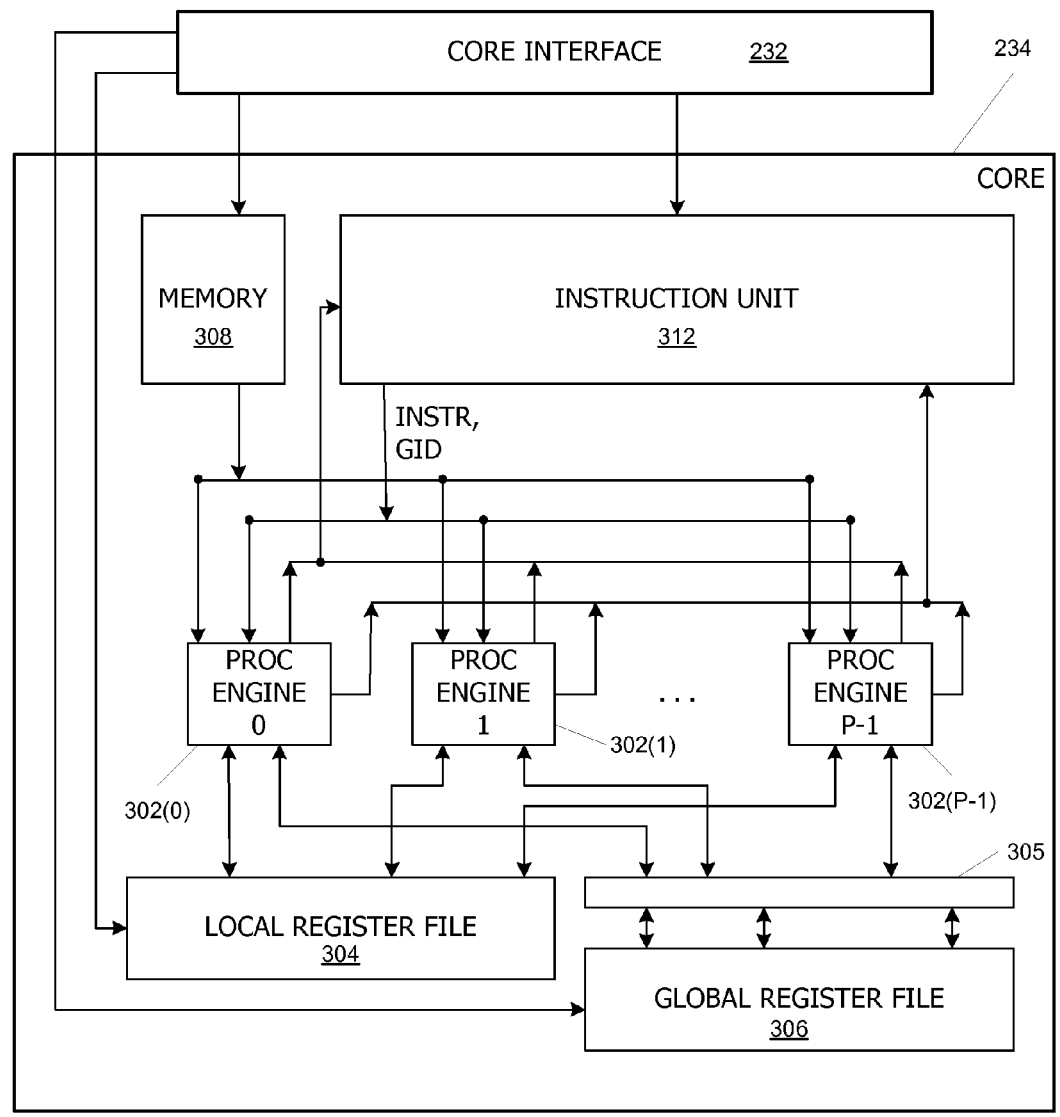
FIG. 3 is a block diagram of a processing core according to an embodiment of the present invention.

FIG. 3 is a block diagram of a core 234 according to an embodiment of the present invention. Core 234 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 234 includes an array of P (e.g., 16) parallel processing engines 302 configured to receive SIMD instructions from a single instruction unit 312. Each parallel processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 is allocated space in a local register file 304 for storing its local input data, intermediate results, and the like. In one embodiment, local register file 304 is physically or logically divided into P lanes, each having some number of entries (where each entry might be, e.g., a 32-bit word). One lane is assigned to each processing unit, and corresponding entries in different lanes can be populated with data for corresponding thread types to facilitate SIMD execution. The number of entries in local register file 304 is advantageously large enough to support multiple concurrent threads per processing engine 302.

Each processing engine 302 also has access, via a crossbar switch 305, to a global register file 306 that is shared among all of the processing engines 302 in core 234. Global register file 306 may be as large as desired, and in some embodiments, any processing engine 302 can read to or write from any location in global register file 306. In addition to global register file 306, some embodiments also provide an on-chip shared memory 308, which may be implemented, e.g., as a conventional RAM. On-chip memory 308 is advantageously used to store data that is expected to be used in multiple threads, such as coefficients of attribute equations, which are usable in pixel shader programs. In some embodiments, processing engines 302 may also have access to additional off-chip shared memory (not shown), which might be located, e.g., within graphics memory 124 of FIG. 1.

In one embodiment, each processing engine 302 is multi-threaded and can execute up to some number G (e.g., 24) of threads concurrently, e.g., by maintaining current state information associated with each thread in a different portion of its allocated lane in local register file 306. Processing engines 302 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 312 is configured such that, for any given processing cycle, the same instruction (INSTR) is issued to all P processing engines 302. Thus, at the level of a single clock cycle, core 234 implements a P-way SIMD microarchitecture. Since each processing engine 302 is also multi-threaded, supporting up to G threads, core 234 in this embodiment can have up to P*G threads in flight concurrently. For instance, if P=16 and G=24, then core 234 supports up to 384 concurrent threads.

Because instruction unit 312 issues the same instruction to all P processing engines 302 in parallel, core 234 is advantageously used to process threads in "SIMD groups." As used herein, a "SIMD group" refers to a group of up to P threads of execution of the same program on different input data, with one thread of the group being assigned to each processing engine 302. For example, a SIMD group might consist of P vertices, each being processed using the same vertex shader program. (A SIMD group may include fewer than P threads, in which case some of processing engines 302 will be idle during cycles when that SIMD group is being processed.) Since each processing engine 302 can support up to G threads, it follows that up to G SIMD groups can be in flight in core 234 at any given time.

On each clock cycle, one instruction is issued to all P threads making up a selected one of the G SIMD groups. To indicate which thread is currently active, a "context identifier" (CID) for the associated thread may be included with the instruction. Processing engine 302 uses context identifier CID as a context identifier, e.g., to determine which portion of its allocated lane in local register file 304 should be used when executing the instruction. Thus, in a given cycle, all processing engines 302 in core 234 are nominally executing the same instruction for different threads in the same group, although in some instances, some threads in a group may be temporarily idle, e.g., due to divergence at branches in the program or the like. In addition, some groups may include fewer than P active threads. In some embodiments, an active mask is applied at instruction issue to control which processing engines 302 execute the instruction so that an instruction can be executed in parallel for a subset of the threads in the SIMD group.

For optimal performance, all threads within a SIMD group are advantageously launched on the same clock cycle so that they begin in a synchronized state. In one embodiment, core interface 232 advantageously allocates the resources needed to execute a SIMD group of a particular type (e.g., pixel shader or vertex shader), loads a SIMD group of that type into core 234, then instructs core 234 to launch the group. "Loading" a group includes supplying instruction unit 312 and processing engines 302 with input data and other parameters required to execute the applicable program. For example, in the case of vertex processing, core interface 232 loads the starting PC value for the vertex shader program into a slot in PC array 316 that is not currently in use; this slot corresponds to the context identifier CID allocated to the new SIMD group that will execute vertex threads. Core interface 232 allocates sufficient space—including, e.g., space in global register file 306 local register file 304—for each processing engine 302 to execute one vertex thread, then loads the vertex data into an input buffer defined within the allocated space.

Once all the data for the group has been loaded, core interface 232 launches the SIMD group by signaling to instruction unit 312 to begin fetching and issuing instructions corresponding to the context identifier CID of the new group. SIMD groups for geometry and pixel threads can be loaded and launched in a similar fashion.

It will be appreciated that the core architecture described herein is illustrative and that variations and modifications are possible. Any number of processing units may be included. In some embodiments, each processing unit has its own local register file, and the allocation of local register file entries per thread can be fixed or configurable as desired.

In one alternative embodiment, SIMD groups containing more than P threads ("supergroups") can be defined. A supergroup is defined by associating the group index values of two (or more) of the SIMD groups (e.g., CID1 and CID2) with each other. When issue logic 324 selects a supergroup, it issues the same instruction to all threads of both (or all) SIMD groups in the supergroup; on one cycle, execution of the instruction begins for CID1, and on the next cycle, execution of the same instruction begins for CID2. Thus, the supergroup is in effect a larger SIMD group. Supergroups can be used to reduce the number of distinct program counters, state definitions, and other per-group parameters that need to be maintained without reducing the number of concurrent threads.

Further examples of processing cores that can be used in embodiments of the present invention are described in above-referenced U.S. Pat. Nos. 7,038,685 and 7,038,686.

Resource Allocation Unit

Core 234 uses a number of resources during thread execution. For example, for vertex shader (VS) threads, the data to be processed by each thread in a SIMD group is loaded into global register file 306. For pixel shader (PS) threads, the data is loaded either into global register file 306 or into a separate pixel input buffer (not explicitly shown in FIG. 3). During thread execution, processing engines 302 use local register file 304 as "scratch" space, storing intermediate results of instruction execution, which may be used as source operands for subsequent instructions. When processing is complete for a SIMD group, core 234 requires sufficient space to store the output data, either in global register file 306, local register file 304, or an output buffer external to core 234.

To prevent execution of a SIMD group from stalling for want of a resource, all resources that a group will need are advantageously allocated before the group is launched. If a resource is not immediately available, the launch is delayed (and no resources are allocated to the group) until all resources become available. In some embodiments, once resources are allocated to a group, they remain allocated until execution of that group is completed. Resources needed only during execution (e.g., context identifiers and local register file entries) may be deallocated and made available for use by another group as soon as execution is completed, while resources needed for post-execution buffering of output data advantageously remain allocated until the output data for the group has been retrieved from its storage location and delivered to the next pipeline stage.

Figure 4:
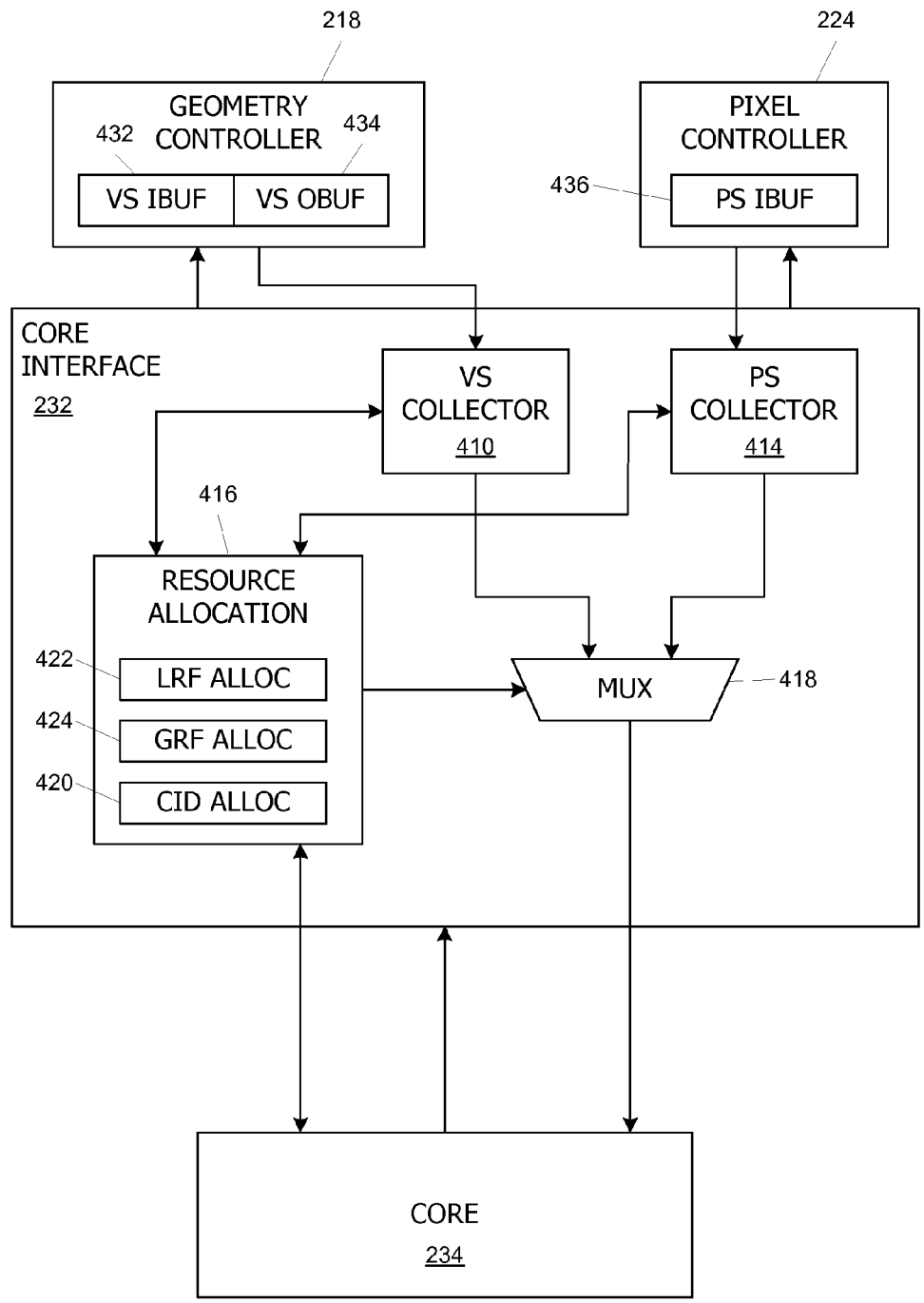
FIG. 4 is a block diagram of a core interface according to an embodiment of the present invention.

In accordance with an embodiment of the present invention, resource allocation is managed by core interface 232. FIG. 4 is a block diagram of core interface 232 according to an embodiment of the present invention. Core interface 232 communicates with a core 234 and also communicates with geometry controller 218 and pixel controller 224 as described above with reference to FIG. 2. It is to be understood that, while only one core 234 is shown, core interface 232 could be modified to communicate with any number of cores.

Core interface 232 includes a vertex-shader (VS) collector 410, and a pixel-shader (PS) collector 414. VS collector 410 receives vertex data from an input buffer 432 in geometry controller 218. PS collector 414 receives pixel data from an input buffer 436 in pixel controller 224. Input buffers 432 and 436 may be implemented as FIFO (first-in, first-out) buffers of generally conventional design. Each collector assembles the input data for up to P threads of the corresponding type(s), then launches a SIMD group to process the assembled data.

In operation, VS collector 410 and PS collector 414 each provide input data for a SIMD group to a steering multiplexer (mux) 418 that directs the data for one or the other thread type to core 234. In this embodiment, data for only one SIMD group can be loaded into core 234 at a given time, and core interface 232 controls when each collector is allowed to load input data into core 234. In some embodiments, core interface 232 may provide access to multiple cores 234, and data for different SIMD groups may be loaded into different cores 234 in parallel. A particular data loading mechanism is not critical to the present invention, and a detailed description of such mechanisms has been omitted.

A resource allocation unit 416 manages the available resources in core 234. In embodiments where core interface 232 provides access to multiple cores, resource allocation unit 416 advantageously manages the available resources in all such cores, including in some embodiments selection of a core to execute each new SIMD group provided by VS collector 410 and PS collector 414. Resource allocation unit 416 is advantageously configured to track resource use, including which context identifiers (CIDs) are in use or free in core 234 and which entries in local register file 304 and/or global register file 306 of core 234 (see FIG. 3) are in use or free. It will be understood that resource allocation unit 416 may also track use of other resources, including various input buffers (not explicitly shown) in core 234, output buffers such as VS output buffer 434 in geometry controller 218, entries in a data cache and/or instruction cache associated with core 234, and so on.

In one embodiment, resource allocation unit 416 includes a CID allocation module 420 that tracks which context identifiers CID (0 through G-1) are allocated or available, a local register file (LRF) allocation module 422 that tracks which entries in local register file 304 are allocated or available, and a global register file (GRF) allocation module 424 that tracks which entries in global register file 306 are allocated or available.

Using these allocation modules, examples of which are described below, resource allocation unit 416 determines whether sufficient resources for a new SIMD group are available and, if all needed resources are available, allocates the resources to each new SIMD group. In some embodiments, resource allocations for all execution resources are made at the outset of the loading process so that loading of a SIMD group into core 234 is begun only when sufficient resources are available to complete the loading and execute the group. In other words, resource allocations for a SIMD group are made only when it is known that all of the needed resources can be allocated. The amount of a particular resource required may be different for different types of threads; for instance, PS threads and VS threads may each require a different number of local register file entries. In one embodiment, resource requirements for each thread type are provided as state information to core interface 232.

In accordance with an embodiment of the present invention, each resource is apportioned among the thread types to be supported in core 234. That is, for each thread type, a limit is established on the amount of each resource that can be allocated to SIMD groups of that thread type. For example, in one embodiment, the total number of concurrent SIMD groups in core 234 is limited to G (e.g., 24), and each SIMD group is allocated one of G unique context identifiers CID. The number G may be apportioned between PS and VS groups, with PS groups being allowed to use up to x of the context identifiers while VS groups are allowed to use up to G-x of the identifiers. The apportionment may be equal or unequal as desired; e.g., if PS threads are expected to outnumber VS threads, G might be 24 while x is 20.

In another embodiment, local register 30 of FIG. 3 file 304 of FIG. 3 includes a number R of entries that may be apportioned between VS and PS groups. For instance, PS threads might allowed to use up to Q of the entries and VS threads allowed to use up to R-Q of the entries. Again, the apportionment may be equal or unequal as desired.

The apportionment of each resource is advantageously determined so as to load-balance the multithreaded core array of which core 234 is a part. For example, many currently existing graphics application programs are "pixel-intensive," meaning that a graphics processor will spend far more cycles per frame processing pixel data than vertex data. Accordingly, it may be desirable to skew the apportionment to favor PS groups over VS groups. However, if PS groups are too strongly favored, VS groups will not be timely processed, and the pixel section of the rendering pipeline will tend to be starved for input data, leading to inefficiency.

In some embodiments, resource apportionment among the thread types is determined at application launch time. In other embodiments, an initial apportionment of resources can be dynamically updated during execution of the application to better balance the load between different types of threads. Examples of resource apportionment and dynamic load balancing in accordance with embodiments of the present invention are described below.

Referring again to FIG. 4, after resource allocation unit 416 allocates resources for a SIMD group, the appropriate one of collectors 410, 414 loads the data for that group into core 234, then signals core 234 to begin execution of the group. When core 234 completes execution of a SIMD group, core 234 signals completion to resource allocation unit 416, which updates allocation modules 420, 422, 424 to indicate that all resources associated with the completed SIMD group are now available for reallocation to a new group.

In some embodiments, collectors 410, 414 are configured to send a resource request to resource allocation unit 416 when they begin to receive input data for a new SIMD group and to wait for a response from resource allocation unit 416 before proceeding further. Resource allocation 416 may arbitrate between competing resource requests for new VS and PS groups, deciding which request should take priority.

Once a request has been selected, resource allocation unit 416 selects a core 234 (if multiple cores are available), allocates a context identifier CID, and also a sufficiently large space in the local register file 304 and/or global register file 306 of the selected core, where "sufficient" is determined based in part on the thread type associated with the collector making the request. After allocating the resources, resource allocation unit 416 also controls steering mux 418 to steer input data provided by collectors 410, 414 to core 234.

In one embodiment, if sufficient resources are not available when resource allocation unit 416 receives a request (e.g., if no context identifier is available in core 234 or if core 234 lacks sufficient space in its local register file 304 or global register file 306), resource allocation unit 416 delays its response to the request until sufficient resources become available. In the meantime, the requesting collector 410, 414 holds up its input data stream until the request is serviced, exerting backpressure on the pipeline. Data may accumulate in VS input buffer 432, PS input buffer 436, and/or elsewhere upstream during this period. In some embodiments with multiple core interfaces 232, geometry controller 218 and/or pixel controller 224 of FIG. 2 can detect when a collector in one core interface 232 is exerting backpressure and can redirect data from VS input buffer 432 and/or PS input buffer 436 to a different core interface 232.

In one embodiment where core interface 232 provides access to two or more cores 234, both VS collector 410 and PS collector 414 can be active at the same time, with each collector feeding a different core 234. In another embodiment, only one of the collectors 410, 414 is active at a given time, and resource allocation unit 416, which communicates with both collectors, is advantageously configured to delay responding to requests from either collector if the other collector is already active. In still other embodiments, it is possible to write multiple data streams in parallel into local register file 304, global register file 306 or other storage in the same core 234, and limiting the number of simultaneously active collectors is not required.

It will be appreciated that the core interface described herein is illustrative and that variations and modifications are possible. For instance, FIG. 4 illustrates a core interface that handles two thread types (VS and PS). The present invention is not limited to two thread types or to any particular combination of thread types; thus, a core interface could also handle other thread types, such as geometry shader (GS) threads, in addition to or instead of VS and PS threads. Separate collectors for each thread type may be provided, or multiple types may share a collector as desired; the resource allocation unit arbitrates among multiple collectors to the extent needed for a particular embodiment. In one embodiment, a core interface that provides access to multiple cores can handle VS, GS, and PS threads with each core processing two of the three types (e.g., either VS and PS or GS and PS). In still other embodiments, one core can execute threads of all three types. More than three thread types could also be supported.

Further, the present invention does not require that threads be executed in SIMD groups or that resource allocation be handled per SIMD group; the present invention can be practiced with single threads or with SIMD groups or other groups of any number of threads.

Examples of resource allocation and load balancing will now be described for two different resources: context identifiers and local register file entries. For purposes of the following description, a core interface 232 that handles two thread types (VS and PS) is used as an example; it is to be understood that other combinations of thread types could be substituted. The following description also makes references to allocating resources for "a thread," and it is to be understood that, where core 234 is a SIMD processor, the same techniques could be used to allocate resources for a SIMD group of threads of like type. Thus, "a thread" should be understood as also including a group of threads of like type.

Allocation and Load Balancing for Context Identifiers

Figure 5:
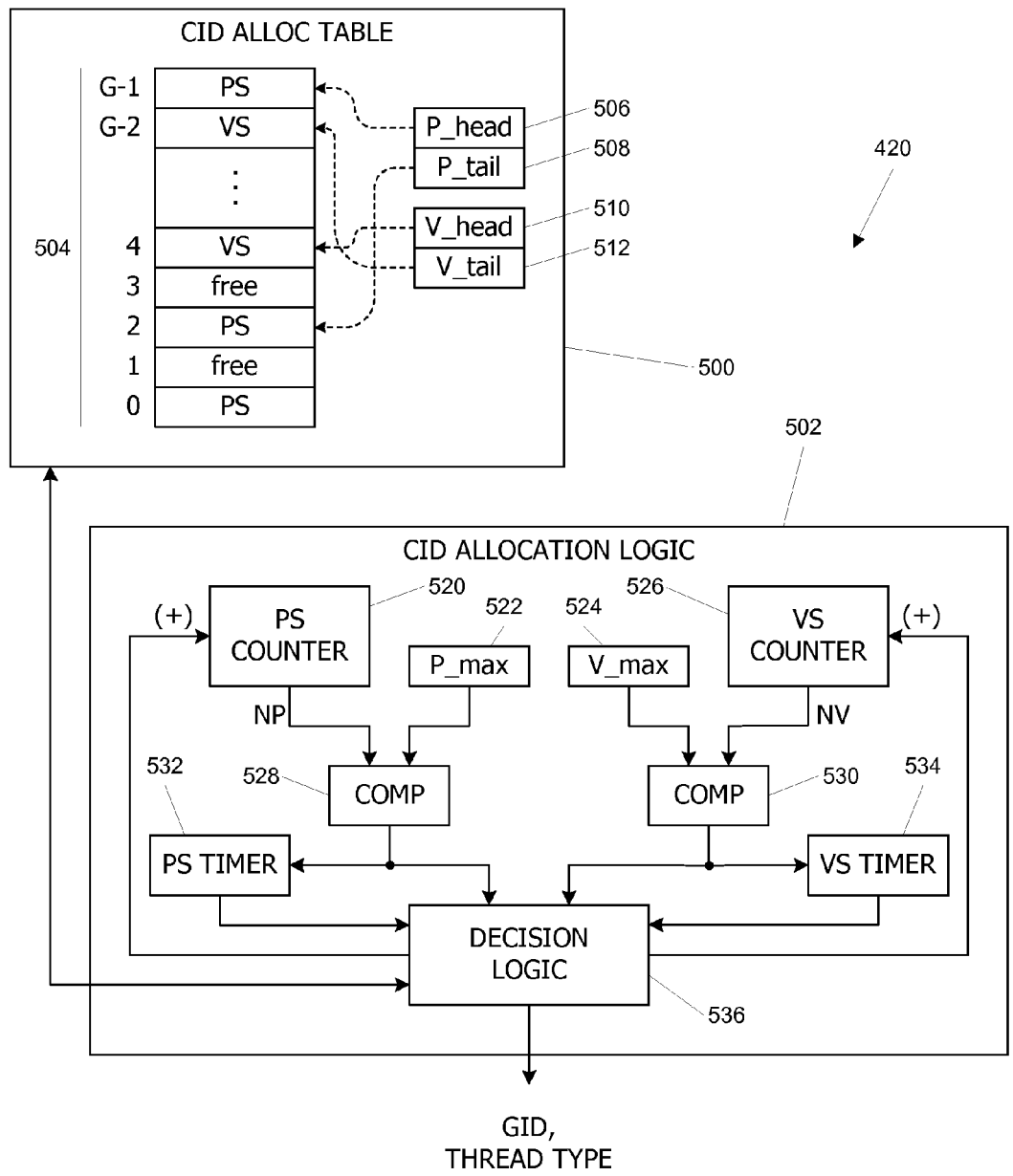
FIG. 5 is a block diagram of allocation logic for allocating context identifiers to threads according to an embodiment of the present invention.

FIG. 5 is a block diagram of CID allocation module 420 according to an embodiment of the present invention. CID allocation module 420 includes a CID allocation table 500 and a CID allocation logic unit 502. CID allocation table 500 includes a number of slots 504, corresponding to the number (G) of available thread (or group) identifiers. Each slot 504 stores a value indicating whether that slot is allocated or "free" (i.e., available for use by a new thread). For each slot that is allocated, CID allocation table 500 stores a value indicating the thread type to which that slot is allocated. For instance, in FIG. 5, "PS" indicates that a slot 504 is allocated to a pixel thread and "VS" indicates that the slot 504 is allocated to a vertex thread.

Within CID allocation table 500, allocations for each thread type are made in circular FIFO fashion. Pointers P_head 506 and P_tail 508 are used to keep track of which CIDs were most recently and least recently allocated to PS threads. Similarly, pointers V_head 50 10 and V_tail 512, are used to keep track of which CIDs were most recently and least recently allocated to VS threads. To maintain the circular FIFO behavior, pointer P_head 506 is not allowed to pass pointer P_tail 508. For instance, in FIG. 5, context identifier 1, which is free, could be assigned to a PS thread, but context identifier 3, which is also free, could not be assigned to a pixel thread, because pointer P_head 506 would pass pointer P_tail 508.

Allocation of context identifiers is managed by CID allocation logic 502. CID allocation logic 502 includes a PS counter 520, a register 522, and a comparison circuit 528. PS counter 520 counts the number (NP) of active pixel shader threads in core 234. Counter 520 is incremented each time a new PS thread is launched, and decremented each time a PS thread completes. Register 522 stores a value P_max, which represents an upper limit on the number of PS threads allowed to execute concurrently in core 234. Decision logic 536 communicates with PS collector 414 and VS collector 410 of FIG. 4. When PS collector 414 indicates that data for a new PS thread is available, comparison circuit 528 compares the number NP of currently active PS threads with the limit P_max stored in register 522 to determine whether another context identifier can be allocated to a PS thread.

Similarly, CID allocation logic 502 includes a VS counter 526, a register 524 and a comparison circuit 530. VS counter 526 counts the number (NV) of active vertex shader threads in core 234. Counter 526 is incremented each time a new VS thread is launched, and decremented each time a VS thread completes. Register 524 stores a value V_max, which represents an upper limit on the number of VS threads allowed to execute concurrently in core 234. When VS collector 410 of FIG. 4 indicates that data for a new VS thread is available, comparison circuit 530 compares the number NV of currently active VS threads with the limit V_max stored in register 524 to determine whether another context identifier can be allocated to a VS thread.

In some embodiments, decision logic 536 also determines whether a PS thread or a VS thread should be loaded next. Operation of decision logic 536 is described further below.

In some embodiments, CID allocation logic 502 also includes a PS timer 532 and a VS timer 534. These timers can be used to determine whether pixel shader threads or vertex shader threads are underusing their respective portions of the context identifiers, as described below.

Figure 6A:
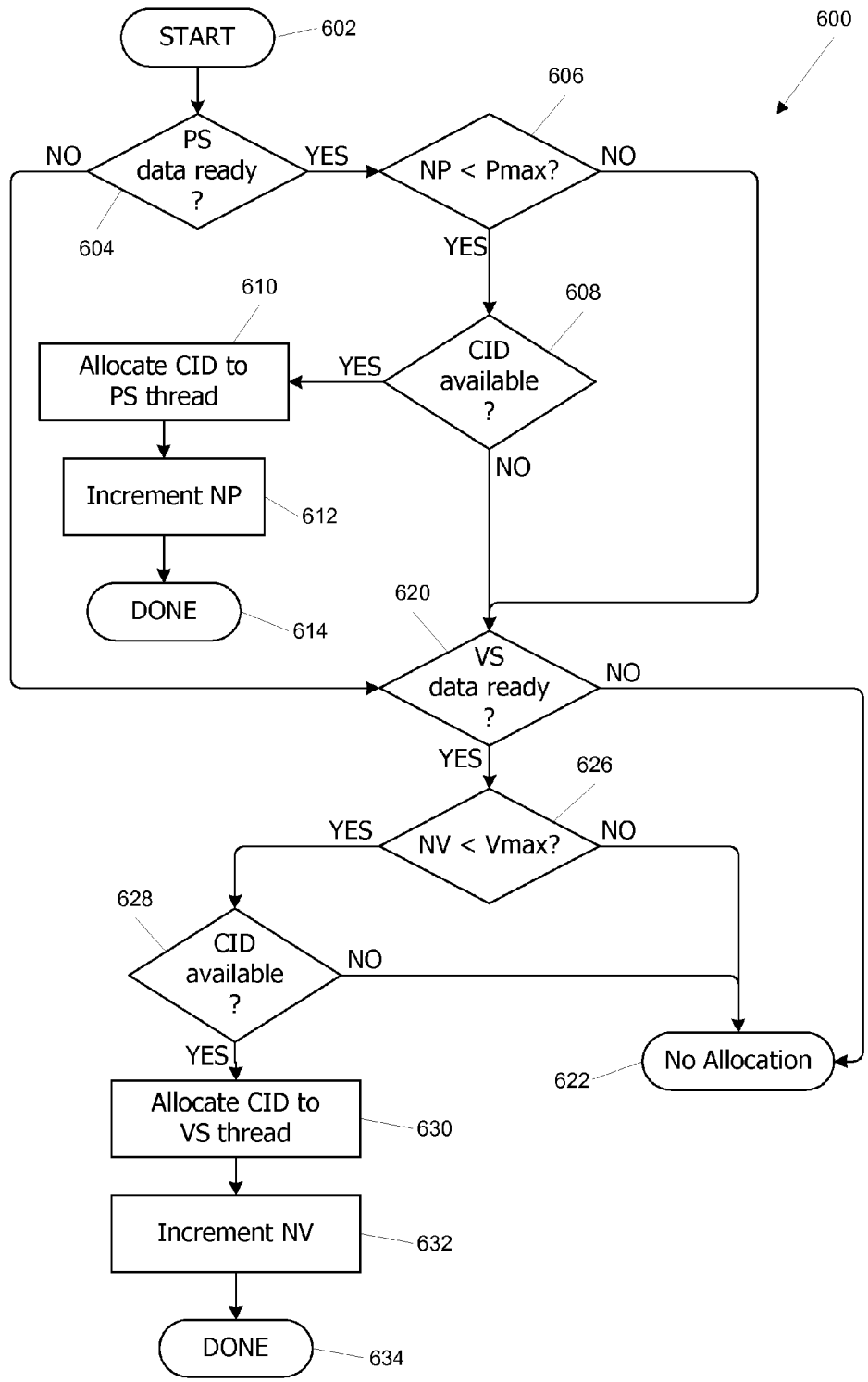
FIGS. 6A and 6B are flow diagrams of process for allocating context identifiers to threads according to two embodiments of the present invention.
Figure 6B:
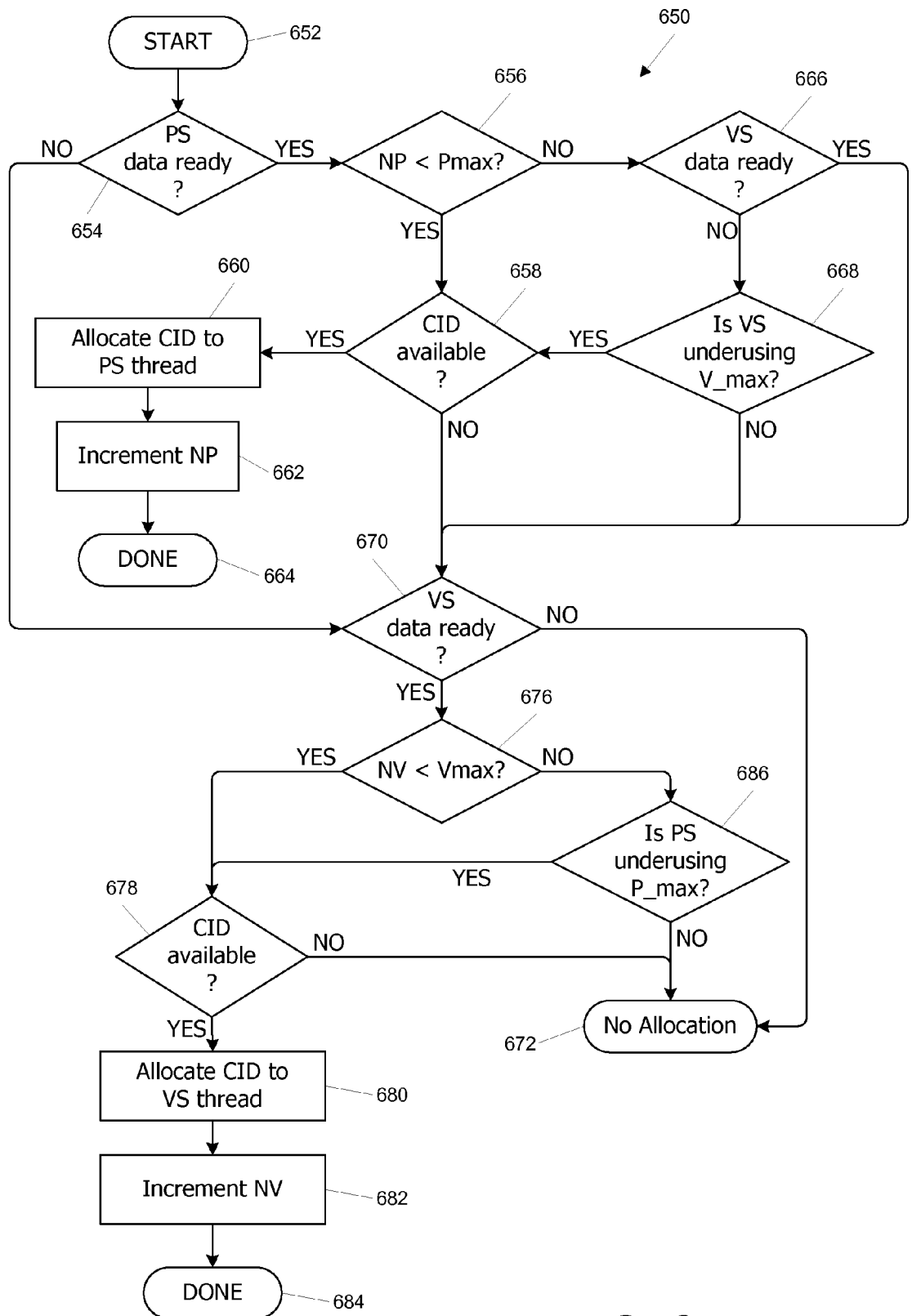

FIGS. 6A and 6B are flow diagrams of allocation processes that can be executed by decision logic 536 according to two embodiments of the present invention. In both examples, pixel shader threads are given priority unless the number of active pixel shader threads is already at its upper limit, in which case vertex shader threads are given priority. In FIG. 6A, the upper limits P_max and V_max are hard limits that cannot be exceeded. In FIG. 6B, the upper limits P_max and V_max are soft limits, and one thread type can exceed its limit if the other thread type is "underusing" its apportionment.

Referring to FIG. 6A, process 600 starts (step 602) on each new clock cycle. Decision logic 536 communicates with PS collector 414 and VS collector 410 of FIG. 4 to determine which of the collectors has thread input data ready to be loaded. At step 604, decision logic 536 determines whether PS data is ready; if not, then process 600 checks for VS data as described below. If PS data is ready, decision logic 536 proceeds to steps 606 to determine whether the number NP of currently active pixel threads is below the upper limit P_max. If not, then vertex shader threads are given priority. Processing for vertex shader threads is described below.

If, at step 606, the number of PS threads is below the limit P_max, then at step 608 decision logic 536 determines whether a CID is available for allocation to a pixel thread. As described above, CIDs in this embodiment are allocated in a circular FIFO fashion, and pointer P_head 506 cannot pass pointer P_tail 508. This condition may be tested at step 608. If a CID can be allocated, then at step 610, the CID is allocated to a new PS thread. At step 612, PS counter 520 is incremented. At step 614, process 600 exits.

If PS data is not ready at step 604, or if the active number of PS threads is not below the limit at step 606, or if a CID cannot be allocated to a pixel thread at step 608, then process 600 proceeds to step 620 to determine whether VS data is ready to be loaded. If not, then process 600 exits at step 622 without making an allocation.

If, however, VS data is ready at step 620, then at step 626 process 600 determines whether the number (NV) of active vertex threads is less than the upper limit V_max. If not, process 600 exits at step 622 without making an allocation.

If at step 626, the number of active VS threads is below the limit V_max, then process 600 proceeds to step 628 to determine whether a CID can be allocated to a VS thread. As described above, CIDs in the embodiment are allocated in a circular FIFO fashion for each thread type, and pointer V_head 510 cannot pass pointer V_tail 512. This condition may be tested at step 628. If a CID can be allocated, then at step 630, the CID is allocated to a new VS thread. At step 632, VS counter 526 is incremented. At step 634, process 600 exits.

Referring now to FIG. 6B, process 650 is generally similar to process 600, except that the number of threads of either thread type (PS or VS) is allowed to exceed its upper limit (P_max or V_max) if the other thread type is not using all of its reserved share of the pool of CIDs and has no immediate need for a new CID. In effect, a thread type for which throughput might otherwise be throttled by the upper limit can "borrow" from the share of the pool that is reserved for the other thread type, but only to the extent that the other thread type is "underusing" its reserved share of the pool.

Process 650 starts (step 652) on each new clock cycle. Decision logic 536 communicates with PS collector 414 and VS collector 416 to determine which of the collectors has thread input data ready to be loaded. At step 654, decision logic 536 determines whether PS data is ready; if not, then process 600 checks for VS data as described below. If PS data is ready, decision logic 536 proceeds to steps 656 to determine whether the number NP of currently active pixel threads is below the upper limit P_max. If not, then a vertex shader thread is given priority if VS data is available as described below with reference to steps 666 and 668.

If, at step 656, the number of PS threads is below the limit P_max, then at step 658 decision logic 536 determines whether a CID is available for allocation to a pixel thread. As described above, CIDs in the embodiment are allocated in a circular FIFO fashion for each thread type, and pointer P_head 506 cannot pass pointer P_tail 508. This condition may be tested at step 658. If a CID can be allocated, then at step 660 the CID is allocated to a new PS thread. At step 662, PS counter 520 is incremented. At step 664, process 600 exits.

Referring back to step 656, if the number NP of pixel threads is not below the upper limit R_max, then process 650 proceeds to step 666 to determine whether VS data is ready to be loaded. If so, then a vertex thread is given priority. If no VS data is available, then the PS thread may attempt to "borrow" a context identifier from the portion of the pool reserved for vertex threads. More specifically, at step 668, process 600 determines whether the VS threads are underusing their reserved number V_max of context identifiers.

A variety of conditions may be tested to determine whether VS threads are underusing their reserved number of context identifiers. In one embodiment, the number NV of active VS threads is compared to the upper limit V_max, and underuse occurs if NV happens to be less than V_max at the time the comparison is made. An alternative embodiment employs VS timer 534 of FIG. 5. In one embodiment, VS timer 534 is a counter that is reset whenever the number NV of active vertex threads reaches the upper limit V_max and increments whenever NV is less than V_max. The underuse determination at step 668 may include checking VS timer 534 to determine whether timer 534 is above or below a predefined threshold, which may be a configurable system parameter. If timer 534 is above the threshed, then VS threads are underusing their reserved number of context identifiers, and process 650 proceeds to step 658 to determine whether a CID for a new PS thread is available. If timer 534 is below the threshold, then VS threads are considered to be fully using their reserved number of context identifiers, and process 650 proceeds to step 670 to determine whether a VS thread can be processed.

Step 670 is reached if PS data is not ready at step 654, or if the active number of PS threads is not below the limit P_max at step 656 and VS data is available at step 666, or if a CID cannot be allocated to a PS thread at step 658. At step 670, process 650 determines whether VS data is ready to be loaded. If not, then process 650 exits without making an allocation (step 672).

If, however, VS data is ready at step 670, then at step 676 process 650 determines whether the number (NV) of active vertex threads is less than the upper limit V_max. If not, then process 600 exits at step 672 without making an allocation.

If at step 676, the number of active VS threads is below the limit V_max, then process 650 proceeds to step 678 to determine whether a CID can be allocated to a new VS thread. As described above, CIDs in this embodiment are allocated in a circular FIFO fashion for each thread type, and pointer V_head 510 cannot pass pointer V_tail 512. This condition may be tested at step 678. If a CID can be allocated, then at step 680 the CID is allocated to a new VS thread. At step 682, VS counter 526 is incremented. At step 684, process 650 exits.

Referring back to step 676, if the number NV of VS threads is not below the upper limit V_max, then process 650 proceeds to step 686 to determine whether the VS thread may "borrow" a context identifier from the portion of the pool of context identifiers allotted to PS threads. More specifically, at step 686, process 650 determines whether the PS threads are underusing their allotted number P_max of context identifiers.

As with VS threads at step 668, a variety of conditions may be used at step 686 to determine whether PS threads are underusing their reserved number of context identifiers. In one embodiment, the number NP of active PS threads is compared to the upper limit P_max, and underuse occurs if NP happens to be less than P_max at the time the comparison is made. An alternative embodiment employs PS timer 532 of FIG. 5. In one embodiment, PS timer 534 is a counter that is reset whenever the number of active PS threads reaches the upper limit P_max and increments whenever PS is less than P_max. The underuse determination at step 686 may include checking the PS timer 532 to determine whether timer 532 is above or below a predefined threshold, which may be a configurable system parameter and may be the same as or different from the threshold applied to VS timer 534 at step 668. If PS timer 532 is above the threshold, then PS threads are underusing their reserved number of context identifiers, and process 650 proceeds to step 678 to determine whether a CID is available for allocation to a VS thread, as described above. If PS timer 532 is below the threshold, then PS threads are determined to be fully using their reserved number of context identifiers, and process 650 exits without making any allocation (step 672) since it was already determined that a CID would not be allocated to a PS thread in the current cycle.

It should be noted that process 650 provides a form of dynamic load balancing that has approximately the same effect as adjusting the limits P_max and V_max. For instance, suppose that P_max and V_max are chosen so as to reflect an expected ratio of VS demand to PS demand for a particular application. To the extent that actual demand matches the expected ratio, process 650 will result in an average number of active PS threads that is close to P_max and an average number of active VS threads that is close to V_max. If, however, the actual demand does not reflect the ratio, one thread type will tend to underuse its reserved number of CIDs, and the other thread type will be able to borrow additional CIDs. Thus, the average number of active PS threads may be more or less than P_max, and the average number of active VS threads may correspondingly be less or more than V_max. In any case, the machine can be kept almost fully occupied without actually modifying P_max and V_max.

It will be appreciated that the decision logic processes described herein are illustrative and that variations and modifications are possible. Steps described as sequential may be executed in parallel, order of steps may be varied, and steps may be modified or combined. For instance, the processes described above give priority to PS threads over VS threads, at least as long as the number NP of active PS threads is below the upper limit P_max. In other embodiments, the priority could be reversed to favor VS threads, or a different prioritization algorithm (such as round robin or least-recently serviced) could be substituted.

Where dynamic load balancing through borrowing is implemented (e.g., as in process 650 of FIG. 6B), any suitable test may be used to determine whether a thread type (e.g., VS) is underusing its reserved amount of the resource. For example, as noted above, the test may be based on whether the number of currently active VS threads is below the nominal limit at the time of the test and/or on information as to how long the number of active VS threads has been below the nominal limit. Other tests may also be substituted. In some embodiments, the test might be based on predicted future demand, in addition to or instead of past use. For instance, geometry controller 218 and pixel controller 224 of FIG. 4 could supply information to resource allocation unit 416 indicating the number of pending threads (or SIMD groups) in their respective input buffers 432, 436, and a decision as to whether to allow one thread type to borrow a CID from the other could be based on the number of entries in either or both input buffers 432, 436.

The decision algorithms described above can also be extended to embodiments with more than two thread types. For instance, if VS, PS and GS thread types all coexist in the same core 234, each type could be apportioned a number of CIDs from the total available (G). If one thread type, e.g., PS, reaches its upper limit, that type could "borrow" from either of the others (e.g., VS or GS) if one or both happened to be underused.

It should be noted that in embodiments described herein, the pool of CIDs is not divided among thread types; any CID can be allocated to any thread type so long as applicable limits on the total number of CIDs allocated to each thread type are observed.

Allocation and Load Balancing for Local Register File

Figure 7A:
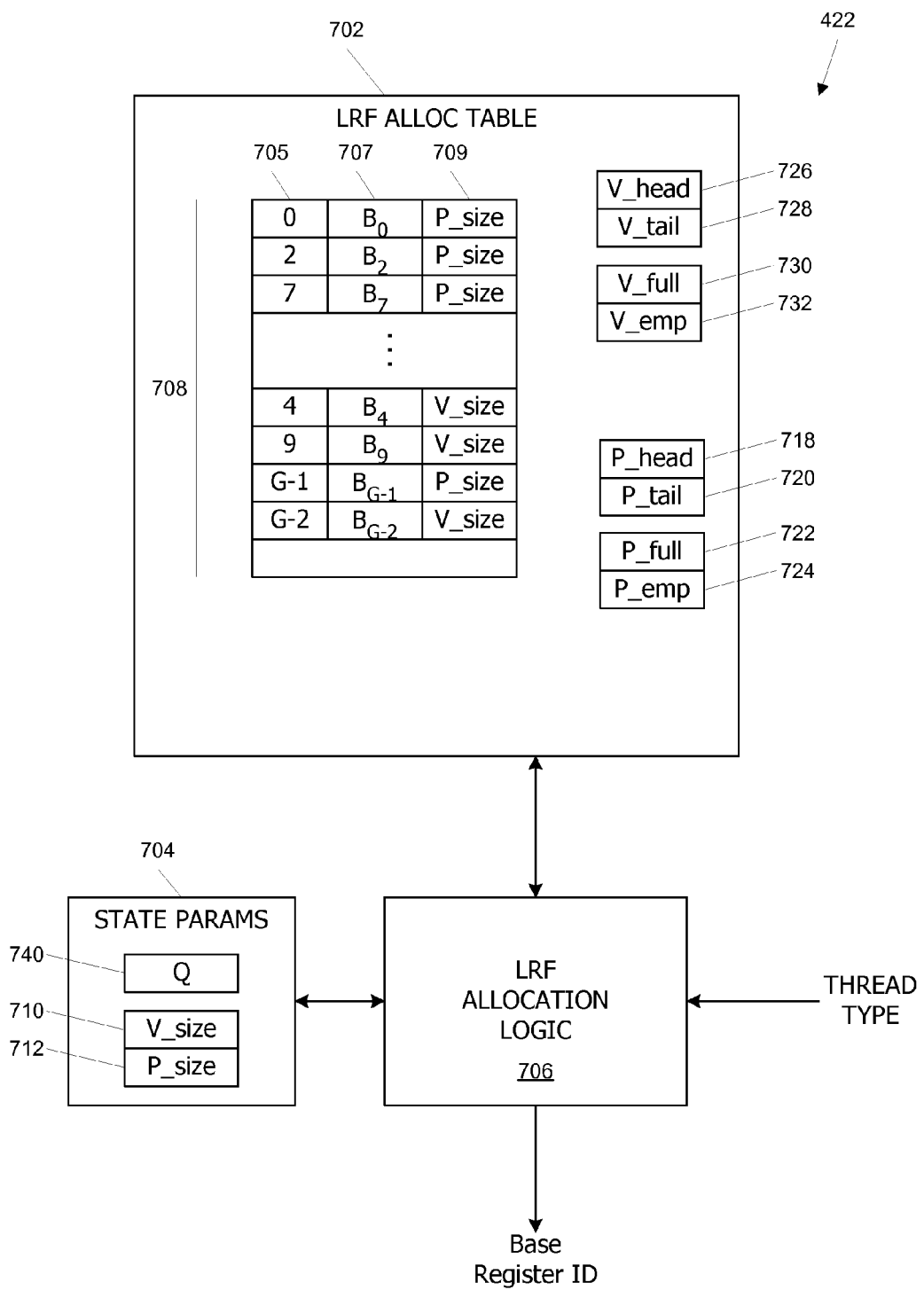
FIG. 7A is a block diagram of a local register file (LRF) allocation module according to an embodiment of the present invention.

FIG. 7A is a block diagram of local register file (LRF) allocation module 422 according to an embodiment of the present invention. LRF allocation module 422 includes an LRF allocation table 702, a state register bank 704 that stores various state parameters related to LRF allocation, and LRF allocation logic 706.

During creation of each new thread (or SIMD group of threads), a block of space in local register file 304 (FIG. 3) is allocated for use by core 234 for executing the new thread. By providing dedicated local register space to each thread that is concurrently executing in core 234, overhead associated with switching from one thread to another is reduced. The size of the block to be allocated for each thread (e.g., the number of registers, or entries) is advantageously specified to core interface 232 as a state parameter that is stored in state register bank 704. In one embodiment, the size of the block to be allocated can be different for different thread types. Accordingly, state register bank 704 includes a register 710 that stores the LRF block size (V_size) for a VS thread and a register 712 that stores the LRF block size (P_size) for a PS thread.

LRF allocation table 702 tracks the entries in LRF 304 allocated to each thread. Specifically, LRF allocation table 702 has a number F of slots 708, where F is at least as large as the number G of concurrent threads (or SIMD groups) supported by core 310. Each slot 708 stores information defining the LRF space allocated to each thread (or group). In the embodiment of FIG. 7A, each thread is allocated a contiguous block of entries in LRF 304. Each slot 708 stores the CID for a thread in a CID field 705, the location (represented in FIG. 7A as $B_{CID}$) of the first LRF entry in the block assigned to the SIMD group CID in a base field 707, and the size of the block allocated (in this example, either P_size or V_size, depending on thread type) in a size field 709. For each slot, a status flag (not explicitly shown) is provided to indicate whether the slot is in use or available to store new allocation information; this status flag is set when a slot is populated with new allocation information and cleared when the LRF resources are freed. In this embodiment, any slot 708 can be used to hold allocation information for any thread type and any CID.

In some embodiments, the number F of slots 708 in LRF allocation table 702 is equal to the number G of threads. In other embodiments, Γ is larger than G; for instance, in one embodiment where G=24, Γ=32. Having extra slots available allows a new block of registers to be allocated to a particular CID before the previously allocated block is released. For example, in some embodiments, output data for a PS thread is buffered in LRF 304 as noted above. When execution of the PS thread completes, the LRF space needs to remain allocated until the output data has been transferred to the next pipeline stage, but the CID does not need to remain allocated to the completed thread. Having extra entries in LRF allocation table 708 advantageously provides space for recording allocation of a new block of LRF entries to a new PS or VS thread associated with the CID while preserving the LRF allocation from the completed thread until such time as the output data has actually been transferred.

Figure 7B:
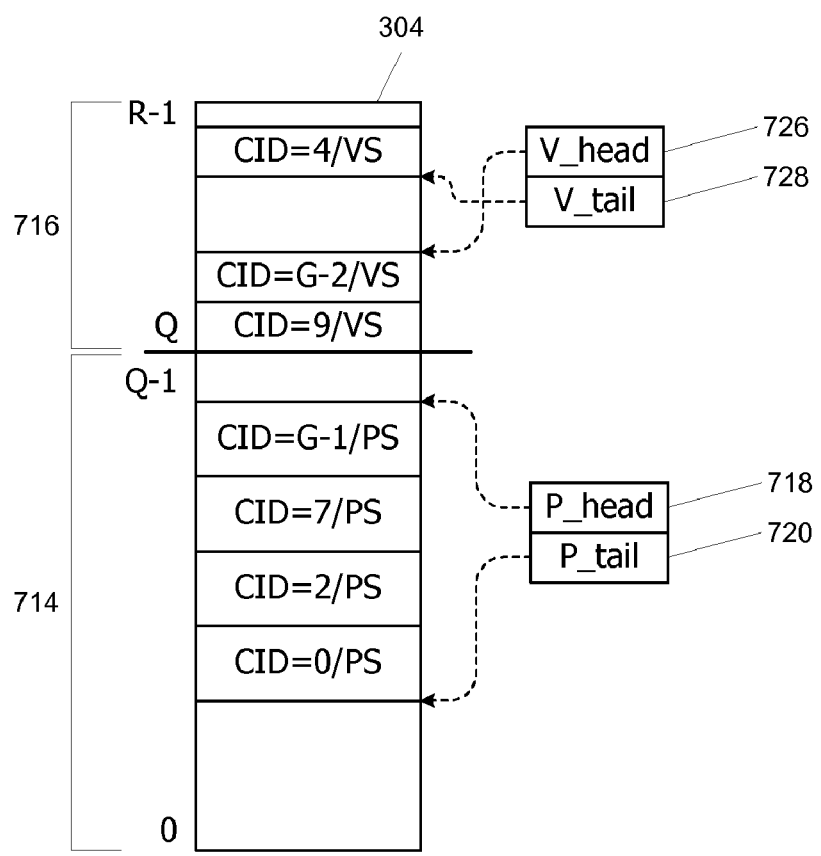
FIG. 7B is a block diagram showing allocation of resources a local register file according to an embodiment of the present invention.

In some embodiments, the block of LRF space allocated to each thread is required to be contiguous, and as operation continues, fragmentation in the LRF could make it difficult to allocate sufficiently large contiguous blocks to new threads. To reduce fragmentation, LRF 304 may be logically divided into a separate section for each thread type; since all allocations for the same thread type will typically be the same size, fragmentation problems can be reduced. As shown in FIG. 7B, LRF 304 can be logically divided into a PS section 714, corresponding to entries 0 through Q-1 in LRF 304, and a VS section 716, corresponding to entries Q through R-1 in LRF 304. PS section 714 is reserved for allocation to PS threads, while VS section 716 is reserved for allocation to VS threads. The boundary point Q is advantageously a configurable state parameter, which may be stored in a state register 740, as shown in FIG. 7A. In some embodiments, the boundary point Q may be dynamically modified during execution of an application program, as described below.

Within each section 714, 716 of LRF 304, entries are allocated in circular FIFO fashion, starting at the bottom of the section and proceeding to the top. Thus, for example, LRF space for PS threads would be allocated starting at entry 0 and ending at entry Q-1, then returning to entry 0 once that entry becomes free again. Similarly, LRF space for VS threads would be allocated starting at entry Q and ending at entry R-1, then returning to entry Q once that entry becomes free again.

For PS threads, a P_head pointer 718 and a P_tail pointer 720 are maintained in LRF allocation table 702 of FIG. 7A, along with a P_full flag 722 and a P_emp flag 724. As shown in FIG. 7B, P_head pointer 718 identifies the next LRF entry available to be allocated to a PS thread (i.e., the next entry after the last entry in the most recently allocated block), and P_tail pointer 720 identifies the first LRF entry in the block that was least recently allocated to a PS thread. P_full flag 722 in LRF allocation table 702 of FIG. 7A is set if pointers P_head 718 and P_tail 720 point to the same LRF entry and at least some entries in PS section 714 are allocated; P_emp flag 724 is set if pointers P_head 718 and P_tail 720 point to the same LRF entry and no entries in PS section 714 are allocated. Use of these pointers and flags is described below.

Similarly, for VS threads, LRF allocation table 702 of FIG. 7A maintains a V_head pointer 726 and a V_tail pointer 728, along with a V_full flag 730 and a V_emp flag 732. As shown in FIG. 7B, V_head pointer 726 identifies the next LRF entry available to be allocated to a VS thread (i.e., the next entry after the last entry in the most recently allocated block), and V_tail pointer 728 identifies the first LRF entry in the block that was least recently allocated to a VS thread. V_full flag 730 (FIG. 7A) is set if pointers V_head 726 and V_tail 728 point to the same LRF entry and at least some entries in VS section 716 are allocated; V_emp flag 732 is set if pointers V_head 726 and V_tail 728 point to the same LRF entry and no entries in VS section 716 are allocated.

In one embodiment, LRF allocation logic 706 receives instructions to allocate LRF space for a new thread, e.g., from CID allocation module 420 described above or from another module within resource allocation unit 416 of FIG. 4. The instruction specifies the thread type for which LRF space is to be allocated. In another embodiment, LRF allocation logic 706 maintains updated "next allocation" information for each thread type, including information as to whether additional LRF space can be allocated for that thread type and if so, which space should be allocated. When a request for a particular thread type is received (e.g., from CID allocation module 420 or another module within resource allocation unit 416 of FIG. 4), the "next allocation" information is used to respond to the request, and space identified in the "next allocation" information is actually allocated only in response to such a request.

In some embodiments, LRF allocation logic 706 uses LRF allocation table 702 (in particular, the V_head, V_tail, P_head and P_tail pointers) to determine which entries in local register file 304 are available to a particular thread type. Based on this information, LRF allocation logic 706 allocates a block of entries to a new thread and updates LRF allocation table 702 to reflect the new allocation by storing the appropriate parameters in any available slot 708. LRF allocation logic 706 advantageously returns a control signal indicating whether the request was successful and, in the event of a successful request, information indicating which entries in LRF 304 are allocated to the new thread. In one embodiment where LRF entries are allocated in contiguous blocks, LRF allocation logic 706 returns the base pointer Bop from field 707 of the appropriate slot 708 in LRF allocation table 702. The base pointer Bop can be used by core 234 to map local register references to allocated blocks on a per-thread basis.

Figure 8A:
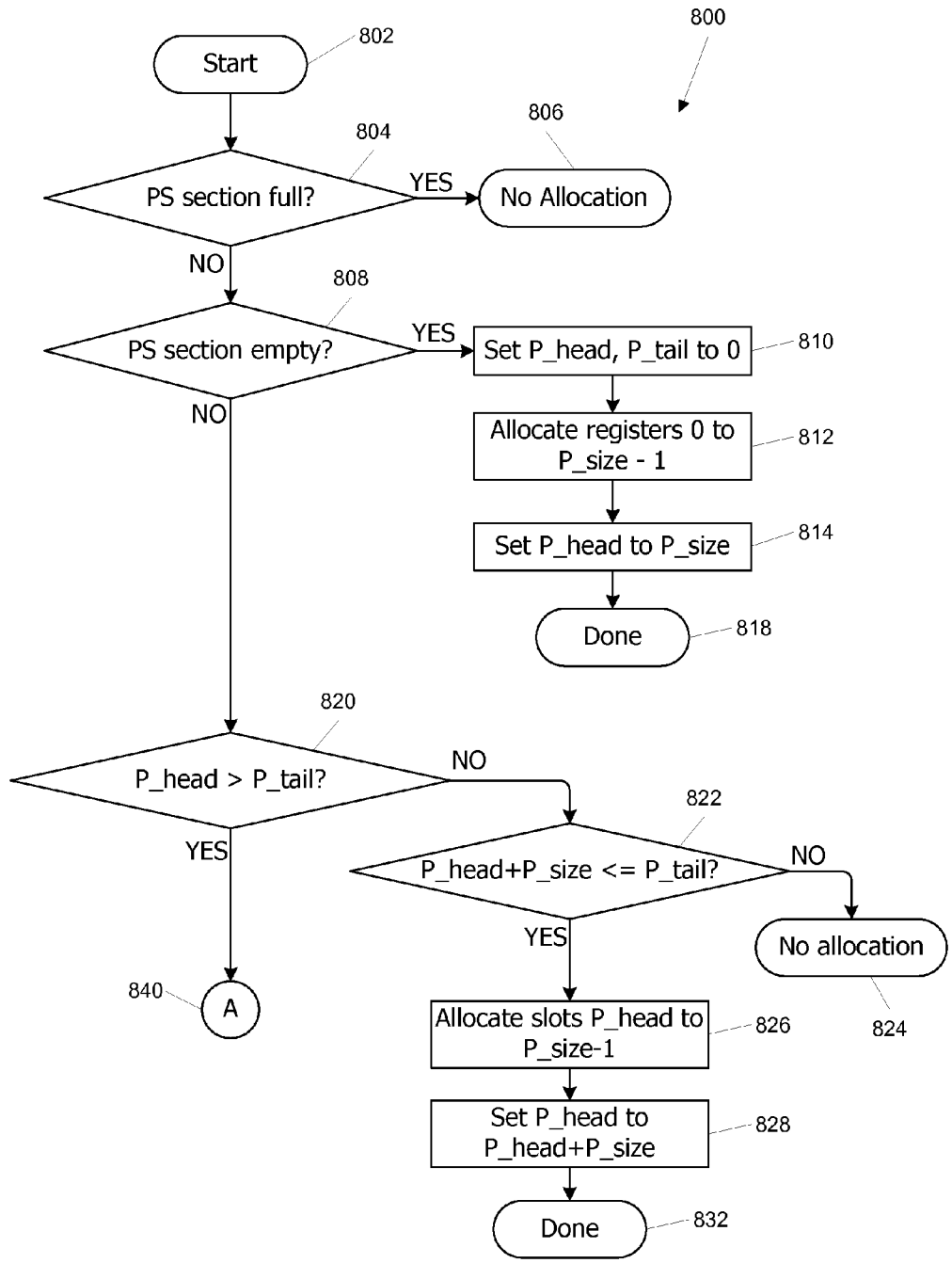
FIGS. 8A and 8B are a flow diagram of a process for allocating LRF space to threads of one type according to an embodiment of the present invention.
Figure 8B:
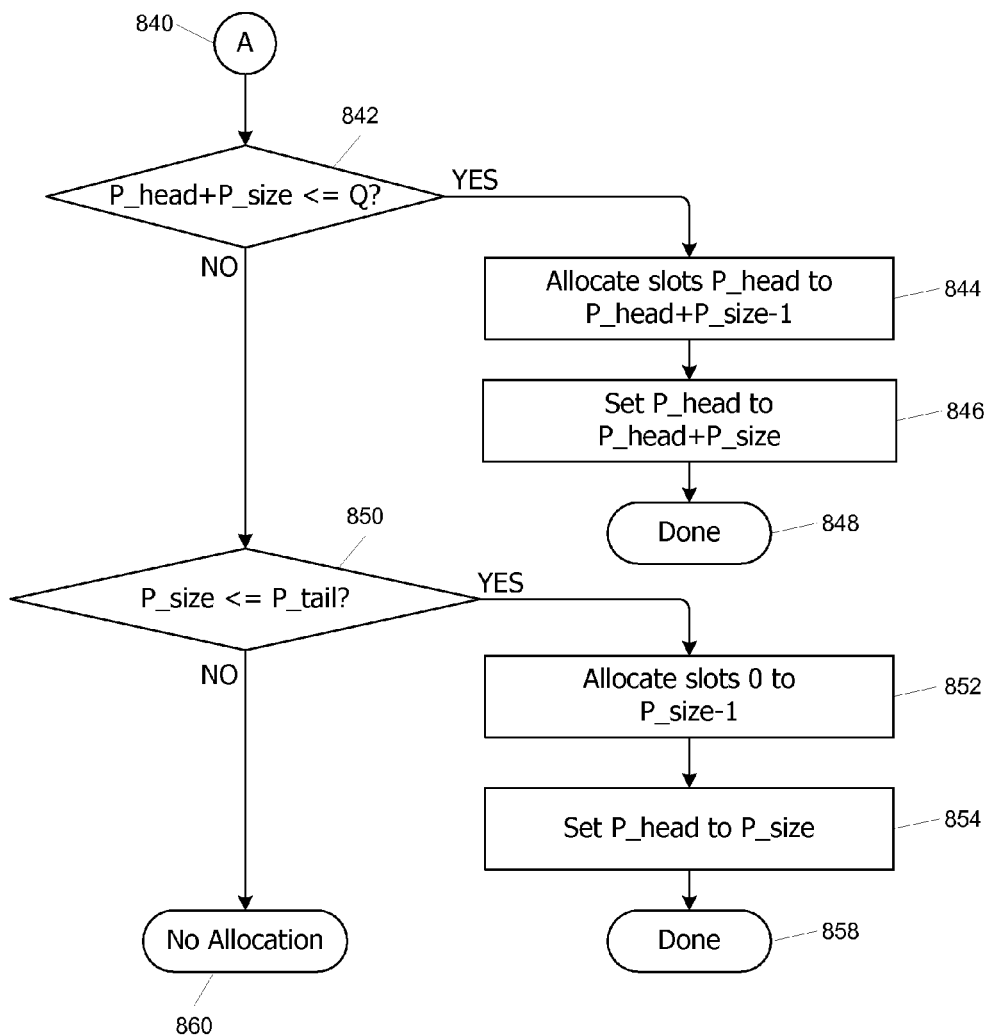

FIGS. 8A and 8B are a flow diagram of an allocation process 800 for PS threads that can be implemented in LRF allocation logic 706 according to an embodiment of the present invention.

In one embodiment, process 800 starts (step 802) when a request to allocate LRF space for a new PS thread is received. At step 804, it is determined whether the PS section 714 of LRF 304 is full, e.g., by checking P_full flag 722. If PS section 714 is full, then process 800 exits without making an allocation (step 806); the allocation failure is advantageously reported and may be used for load balancing as described below.

If PS section 714 is not full, then at step 808, it is determined whether PS section 714 is empty, e.g., by checking P_emp flag 724. If PS section 716 is empty, then an allocation can be made. At step 810, pointers P_head 718 and P_tail 720 are both reset to point to slot 0. At step 812, entries 0 to P_size-1 in LRF 304 are allocated to the new PS thread; the allocation is recorded in an available slot 708 in LRF allocation table 702. At step 814, P_head pointer 718 is advanced to entry P_size. At step 818, process 800 exits, reporting a successful allocation. Step 818 advantageously includes updating P_emp flag 724 (and P_full flag 722, if appropriate) to reflect the state of PS section 714 after the allocation.

If PS section 714 is neither full nor empty, process 800 proceeds to step 820 to determine whether P_head pointer 718 is greater than P_tail pointer 720. If so, then it may be possible to allocate space either "above" P_head or "below" P_tail, as described below with reference to FIG. 8B. If P_head pointer 718 is less than P_tail pointer 720, then any allocation must be made in the area "between" the two pointers. Accordingly, at step 822, it is determined whether P_head+P_size would be less than or equal to P_tail. If not, then there is insufficient space, and process 800 exits without making an allocation (step 824). As noted above, the allocation failure is advantageously reported and may be used for load balancing as described below.

If, at step 822, P_head+P_size is less than or equal to P_tail, an allocation is made. Specifically, at step 826, entries P_head to P_size-1 in LRF 304 are allocated to the new PS thread; the allocation is recorded in an available slot 708 in LRF allocation table 702. At step 828, P_head pointer 718 is advanced to slot P_head+P_size. Process 800 exits at step 832, reporting a successful allocation. Step 832 advantageously includes updating P_emp flag 724 and/or P_full flag 722 to reflect the state of PS section 714 after the allocation.

Node A 840 is reached if P_head pointer 718 is greater than P_tail pointer 720. Referring now to FIG. 8B, at step 842, it is determined whether there is space "above" P_head pointer 718, e.g., by determining whether P_head+P_size is less than or equal to Q (the upper limit of PS section 714). If so, then at step 844, entries P_head to P_head+P_size-1 in LRF 304 are allocated to the new PS thread; the allocation is recorded in an available slot 708 in LRF allocation table 702. At step 846, P_head pointer 718 is advanced to P_head+P_size. At step 848, process 800 exits, reporting a successful allocation. Step 848 advantageously includes updating P_emp flag 724 and/or P_full flag 722 to reflect the state of PS section 714 after the allocation.

If there is insufficient space "above" P_head pointer 718, then at step 850, it is determined whether space is available at the bottom of PS section 714, e.g., whether P_size is less than or equal to P_tail. If so, then at step 852, entries 0 to P_size-1 in LRF 304 are allocated to the new PS thread; the allocation is recorded in an available slot 708 in LRF allocation table 702. At step 854, pointer P_head 718 is advanced to P_size. At step 858, process 800 exits, reporting a successful allocation. Step 858 advantageously includes updating P_emp flag 724 and/or P_full flag 722 to reflect the state of PS section 714 after the allocation.

If, at step 850, space is not available at the bottom of PS section 714, then process 800 exits without making an allocation (step 860). As noted above, the allocation failure is advantageously reported and may be used in load balancing as described below.

It will be appreciated that the LRF allocation process described herein is illustrative and that variations and modifications are possible. Steps described as sequential may be executed in parallel, order of steps may be varied, and steps may be modified or combined. In some embodiments, LRF allocation logic 706 uses process 800 to determine a "next" allocation for a PS thread in advance of receiving an actual request; in such embodiments, an allocation failure is reported only if a request for a PS thread is received at a time when sufficient LRF space is not available.

Process 800 is applicable in cases where the LRF block size P_size is smaller than the amount of space allocated to PS threads (e.g., where P_size<Q). If P_size is equal to Q, then an allocation can be made only when the PS section is empty (which can be determined from P_emp flag 724); once an allocation is made, PS section 714 is full, and P_full flag 722 is set. In some embodiments where Q is dynamically modifiable, it is possible that P_size may be greater than Q at some point. Where this is the case, it is not possible to make an allocation for a new PS thread, and new PS threads wait until Q is modified (e.g., as described below) to be at least P_size.

For VS threads, LRF allocation logic 706 may implement a similar allocation process, except that allocations are made from VS section 716 (e.g., slots Q to R-1) of LRF 304 rather than from PS section 714 (e.g., slots 0 to Q-1). In some embodiments, when VS section 716 is empty, it may not be desirable to reset the V_head and V_tail pointers 726, 728 to Q.

It should be noted that the boundary point Q in this embodiment is a hard limit; allocations for PS threads can be made only from PS section 714, and allocations for VS threads can be made only from VS section 716. In some embodiments, boundary point Q is selected in an application-specific manner such that vertex and pixel processing are approximately balanced: that is, pixel processing can be completed within a reasonable time and does not stall for lack of input data.

In practice, determining the optimum boundary point Q for a particular application can be difficult. Accordingly, some embodiments of the present invention provide dynamic load balancing features that allow the boundary point Q to be shifted based on feedback data reflecting the ability or inability of LRF allocation logic 706 to meet the competing demands for LRF space from PS and VS threads.

Figure 9:
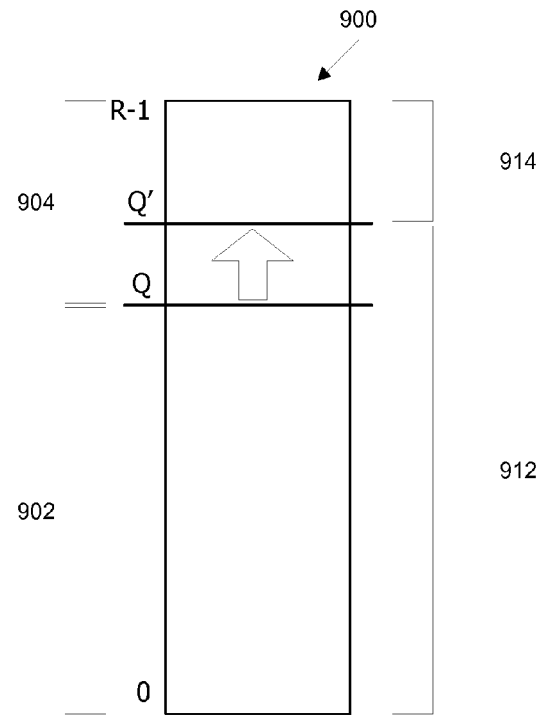
FIG. 9 illustrates an operating principle of load balancing between thread types for a local register file according to an embodiment of the present invention.

FIG. 9 illustrates an operating principle of load balancing in the LRF according to an embodiment of the present invention. Shown therein is a local register file 900 divided into a PS section 902 and a VS section 904 at a boundary point Q. Based on the relative demand for resources between PS threads and VS threads, boundary point Q can be shifted to a new boundary point Q' at some time during processing, thereby defining a modified PS section 912 and a modified VS section 914, which are used to make allocations after the boundary point has been shifted. In this example, shifting to boundary point Q' reduces the size of the VS section and increases the size of the PS section; this would be desirable if the original boundary point Q resulted in PS threads being unable to execute for lack of LRF space while VS threads were not lacking for LRF space. Those of ordinary skill in the art will appreciate that shifting in the opposite direction is also possible and would be desirable in situations where VS threads, rather than PS threads, were disproportionately unable to execute for lack of LRF space.

In some embodiments, LRF load balancing is performed by testing for an asymmetric use condition and shifting boundary point Q (up or down as appropriate) by a fixed increment, Δ, when the asymmetric use condition is detected. By repeatedly testing for the asymmetric use condition and shifting the boundary point Q up or down as needed, the load can eventually be balanced.

The increment Δ can be chosen as desired and can be a configurable system parameter. In one embodiment, Δ is chosen to be the larger (or smaller) of the LRF allocation block sizes V_size or P_size, so that each shift results in either incrementing or decrementing the number of instances of the thread type with the larger (or smaller) LRF footprint that can concurrently execute. In other embodiments, a different (static) increment value is chosen. In still other embodiments, two different increment values might be chosen; for instance, P_size might be used for upward shifts of the boundary point Q while V_size is used for downward shifts. In yet another embodiment, the increment Δ can be dynamically determined, e.g., based on how much additional space is needed to allow an additional allocation for the thread type for which the section size is to be increased. In general, an optimal choice of increment value(s) Δ involves various tradeoffs between load-balancing response time and the ability to achieve a fine-grained balance between the demands of different thread types; the optimum choice will differ from one implementation to the next.

Various conditions may be tested to detect "asymmetric use." For instance, an asymmetric use determination may be based on whether one thread type is fully using its section of LRF 304 while the other thread type is underusing its section, similarly to the underuse test applied during CID allocation. In some embodiments, an asymmetric use determination is based on comparing how often a request to allocate LRF space for threads of each type fails. If requests for one thread type fail significantly more often than requests for the other thread type, then an asymmetry exists. Suitable control logic can be implemented to test for a predefined asymmetric use condition and to signal LRF allocation logic 706 that the boundary point Q needs to be shifted.

Figure 10:
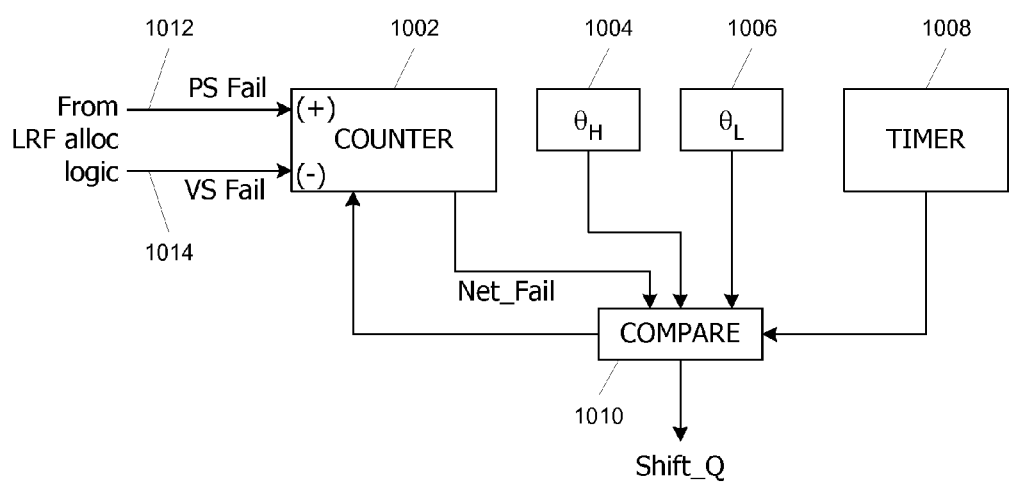
FIG. 10 is a block diagram of control logic for determining when to adjust a load balance point according to an embodiment of the present invention.

For example, FIG. 10 is a block diagram of LRF load-balancing control logic 1000 according to an embodiment of the present invention. Control logic 1000 tests for asymmetric use based on the relative frequency of allocation failures for PS and VS thread types. If a sufficiently large imbalance in allocation failures between the two thread types develops within a sufficiently short time, an asymmetric use condition is detected, and control logic 1000 generates a Shift_Q control signal, alerting LRF allocation logic 706 that boundary point Q needs to be shifted. The Shift_Q signal advantageously also indicates the desired direction of shift (up or down). In response to the Shift_Q control signal, LRF allocation logic 706 advantageously updates the Q value in register 740 (see FIG. 7A) at a convenient time, e.g., as described below with reference to FIG. 12.

As shown in FIG. 10, LRF load balancing control logic 1000 includes a failure counter 1002, threshold registers 1004, 1006, a timer 1008, and a comparison circuit 1010. Failure counter 1002, which is advantageously initialized to zero, receives a signal from LRF allocation logic 706 on line 1012 indicating when an attempt to allocate LRF space for a new PS thread fails and a signal from LRF allocation logic 706 on line 1014 indicating when an attempt to allocate LRF space for a new VS thread fails. A PS allocation failure signaled on line 1012 increments failure counter 1002 while a VS allocation failure signaled on line 1014 decrements failure counter 1002. Thus, counter 1002 counts a net number (Net_Fail) of LRF allocation failures that is equal to the number of PS failures during a given time interval minus the number of VS failures during the same time interval. In one embodiment, Net_Fail is positive if the number of PS failures exceeds the number of VS failures and negative if the number of VS failures exceeds the number of PS failures. The absolute value of Net_Fail reflects the degree of asymmetry in the allocation failures.

Register 1004 stores a "high" threshold $\theta_H$, and register 1006 stores a "low" threshold $\theta_L$. These thresholds define, respectively, a maximum value and a minimum value for Net_Fail: if Net_Fail exceeds $\theta_H$, then PS allocations are failing too often and boundary point Q should be shifted up so as to increase the size of the PS section in LRF 304; if Net_Fail is below $\theta_L$, then VS allocations are failing too often and boundary point Q should be shifted down so as to increase the size of the VS section in LRF 304. In one embodiment, $\theta_H$ is a positive number while $\theta_L$ is a negative number, and the absolute values of $\theta_H$ and $\theta_L$ might or might not be equal.

Comparison circuit 1010 compares the counter value Net_Fail from failure counter 1002 to the thresholds $\theta_H$ and $\theta_L$. Based on these comparisons, comparison circuit 1010 generates the Shift_Q signal in one of three states: "shift up," "shift down," or "no change." In one embodiment, timer 1008 measures a timeout interval, and the Shift_Q signal is generated in the "no change" state unless one of the thresholds $\theta_H$ and $\theta_L$ is reached before the timeout interval elapses.

Figure 11:
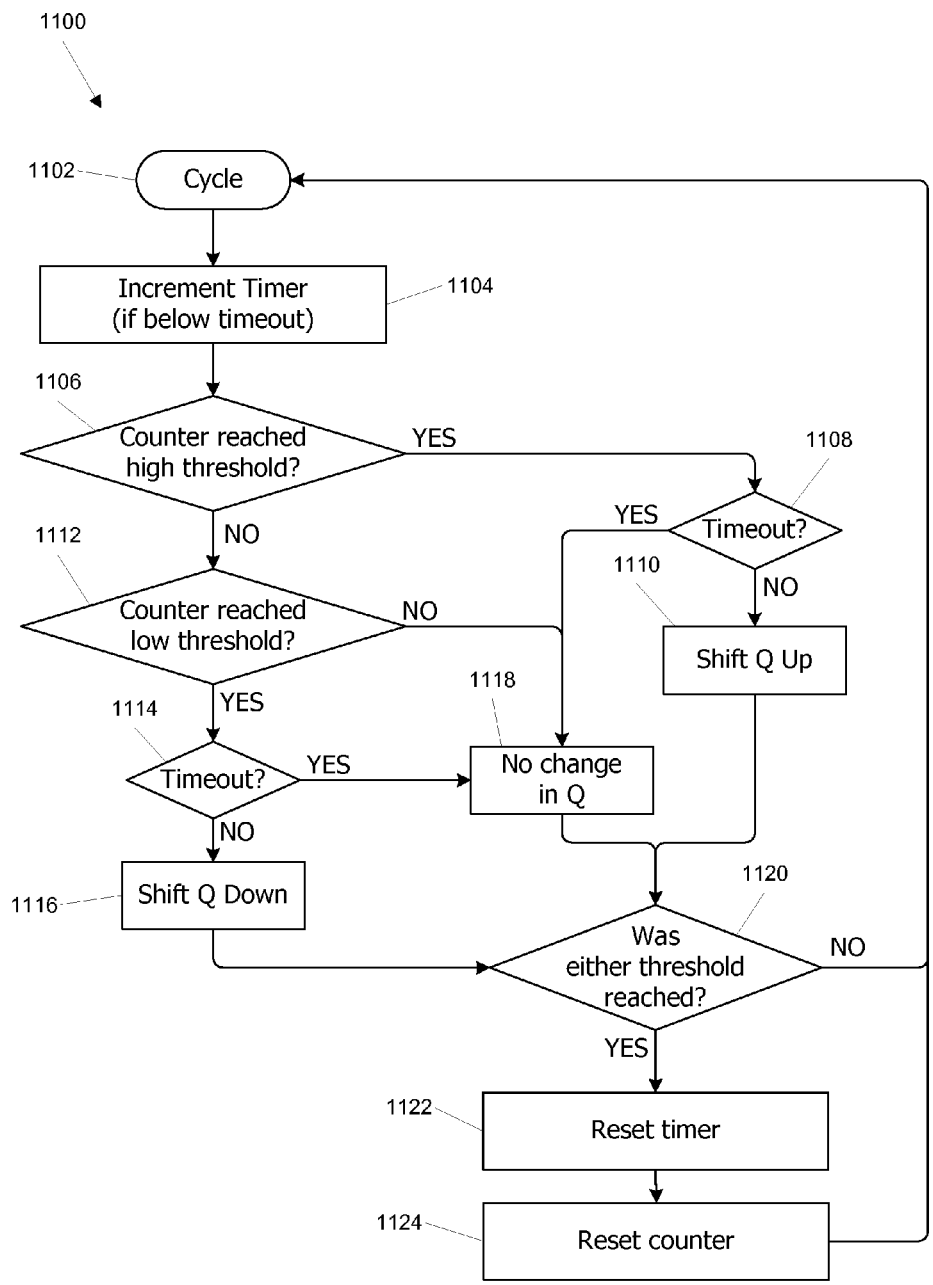
FIG. 11 is a flow diagram of a process for determining when to adjust a load balance point according to an embodiment of the present invention.

FIG. 11 is a flow diagram of a process 1100 that can be implemented using LRF load balancing control logic 1000 of FIG. 10 according to an embodiment of the present invention. Process 1100 is advantageously used in embodiments where the overhead associated with changing the boundary point Q is sufficiently high that accepting a small degree of imbalance is preferred to constantly shifting the boundary point Q in an attempt to achieve an ideal load balance.

On each cycle 1102, timer 1008 is incremented at step 1104. In one embodiment, timer 1008 is incremented until it reaches a timeout value. The timeout value, which may be a configurable system parameter, might be, e.g., 300, 500, or some other number of clock cycles. Once timer 1008 reaches the timeout value, it remains at that value until it is reset as described below.

On each cycle, at step 1106, comparison circuit 1010 compares the net failure count Net_Fail provided by counter 1002 to the high threshold $\theta_H$ stored in register 1004. The high threshold $\theta_H$, which may be a configurable parameter, might be, e.g., 50, 100, or some other number that represents a large imbalance causing failure of many more LRF allocation attempts for PS threads than for VS threads. If the net failure count Net_Fail is at or above the high threshold $\theta_H$, then at step 1108, comparison circuit 1010 determines whether timer 1008 has reached the timeout value. If not, then the failure rate for PS allocations is considered excessively high, and at step 1110, comparison circuit 1010 generates the Shift_Q signal in the "shift up" state, instructing LRF allocation logic 706 to increase the size of the PS section of LRF 304 (and decrease the size of the VS section). If the timeout has already been reached by the time the counter reaches the high threshold, process 1100 proceeds to step 1118 described below.

If the high threshold has not been reached, then at step 1112, comparison circuit 1010 compares the net failure count Net_Fail provided by counter 1002 to the low threshold $\theta_L$ stored in register 1006. (In some embodiments, step 1112 may be performed in parallel with step 1106; at most one of the thresholds will be reached on any given cycle.) The low threshold $\theta_L$, which may be a configurable parameter, might be, e.g., −50, −100, or some other number that represents a large imbalance causing failure of many more LRF allocation attempts for VS threads than for PS threads. If the net failure count Net_Fail is at or below the low threshold $\theta_L$, then at step 1114, comparison circuit 1010 determines whether timer 1008 has reached the timeout value. If not, then the failure rate for VS allocations is considered excessively high, and at step 1116, comparison circuit 1010 generates the Shift_Q signal in the "shift down" state, instructing LRF allocation logic 706 to increase the size of the VS section of LRF 304 (and decrease the size of the PS section).

At step 1118, if neither the high threshold nor the low threshold has been reached, or if one of the thresholds was reached but only after the timeout period had elapsed, then comparison circuit 1010 generates the Shift_Q signal in the "no change" state, so that LRF allocation logic 706 makes no changes in the section sizes.

Regardless of the state of the Shift_Q signal, at step 1120, it is determined whether either threshold was reached. If either threshold was reached, regardless of any effect on the Shift_Q signal, timer 1008 (step 1122) and counter 1002 (step 1124) are both reset, and a new measurement period begins at step 1102. If neither threshold was reached, timer 1008 and counter 1002 continue to run for another cycle (returning to step 1102). Thus, counter 1002 continues to count until either the high or low threshold is reached. The LRF boundary point Q is changed only if counter 1002 reaches a threshold reached before timer 1008 reaches the timeout value. Each time counter 1002 reaches either threshold, counter 1002 and timer 1008 are both reset so that the effect of any change in the boundary point Q can be evaluated.

It will be appreciated that the imbalance detection control logic and process described herein are illustrative and that variations and modifications are possible. Process steps described as sequential may be executed in parallel, order of steps may be varied, and steps may be modified or combined. In one alternative embodiment, timer 1008 runs until it reaches the timeout value, at which point, counter 1002 is compared to the high and low thresholds to determine whether the boundary point Q needs to be shifted up or down (or left unchanged); after making the determination, timer 1008 and counter 1002 are both reset.

In other embodiments, other asymmetric use conditions might be implemented. For instance, rather than defining asymmetric use based on the relative number of LRF allocation failures within a given time period, some embodiments may determine failure rates for PS and VS threads over a given time period, e.g., by determining the fraction of LRF allocation requests for each thread type that fail. A decision to shift Q (or not) may then be based on the failure rate for either or both thread types, e.g., with Q being shifted only when the failure rate for one thread type is significantly higher than the failure rate for the other.

Regardless of the particular asymmetric use condition(s) implemented in a particular embodiment, once it has been determined that boundary point Q should be shifted, the shift is advantageously made without disturbing any active threads. For instance, suppose that boundary point Q is to be shifted up to Q' as depicted in FIG. 9. In the embodiment of FIGS. 7A-7B, once Q is changed to Q', LRF allocation logic 706 can begin allocating entries in the region between Q and Q'-1 to PS threads. If any of these entries are still allocated to VS threads when Q is changed, fragmentation or errors could result. Accordingly, in some embodiments, LRF allocation logic 706 delays shifting Q up or down until the region between Q and Q' (referred to herein as a "transition zone") in LRF 900 is cleared of allocated entries, i.e., until all threads to which entries in the transition zone are allocated have finished executing and released their LRF resources.

In one embodiment, after a signal to shift Q up or down is received, LRF allocation unit 706 simply blocks all further LRF allocations for all thread types until the transition zone is cleared. However, when allocations are blocked, processing work cannot move forward, and this can create backpressure on the entire rendering pipeline that can lead to inefficiency.

Figure 12:
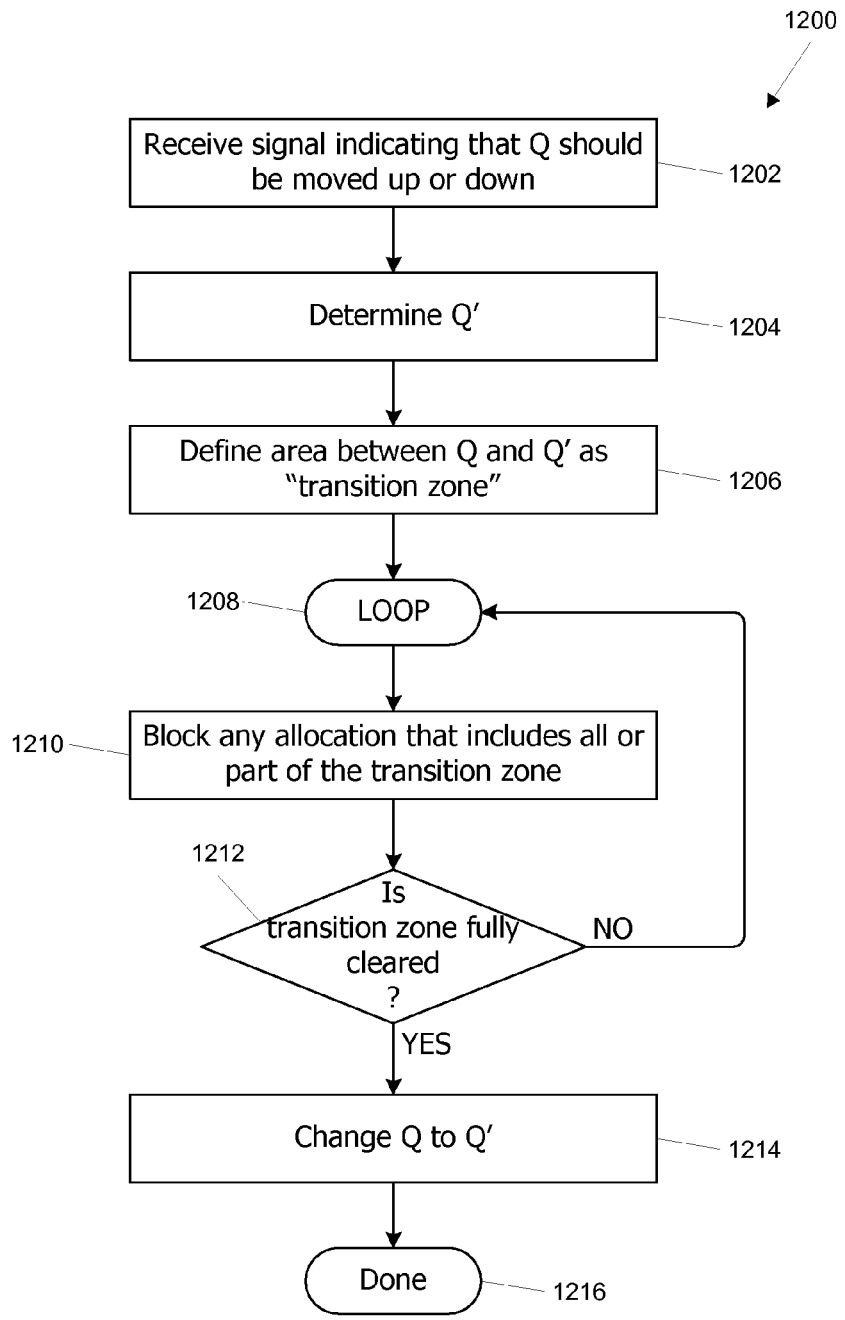
FIG. 12 is a flow diagram of a process for adjusting a load balance point according to an embodiment of the present invention.

In other embodiments, LRF allocation unit 706 selectively blocks allocations that would enter the transition zone until such time as the transition zone is cleared and Q has been shifted to Q', while allowing other allocations to proceed. FIG. 12 is a flow diagram of a control process 1200 for shifting a boundary point Q according to an embodiment of the present invention.

Process 1200 begins at step 1202, when LRF allocation unit 706 receives the Shift_Q signal in either the "shift up" or "shift down" state, indicating that Q should be shifted to a new value Q'. At step 1204, LRF allocation logic 706 determines the new value Q'. In one embodiment, LRF allocation logic 706 determines Q' by adding or subtracting the increment Δ from the current value of Q in register 740 (FIG. 7A). At step 1206, LRF allocation unit 706 defines a "transition zone" consisting of the entries in LRF 304 from entry Q to entry Q'-1. If Q is being shifted up, all entries in the transition zone will eventually be removed from VS section 716 and added to PS section 714; if Q is being shifted down, all entries in the transition zone will eventually be removed from PS section 714 and added to VS section 716.

At step 1208, process 1200 enters a loop that continues until the transition zone is cleared. Specifically, at step 1210, LRF allocation logic 706 blocks any attempted LRF allocation that includes any of the entries in the transition zone. In one embodiment, the allocation blocking of step 1210 is incorporated into the allocation process 800 of FIGS. 8A-8B. For instance, at step 842, P_head+P_size might be tested against the smaller of Q and Q' (which corresponds to the lower end of the transition zone). Similarly, for a VS allocation, the V_head pointer might wrap back to the larger of Q and Q' (which corresponds to the slot after the upper end of the transition zone).

Referring again to FIG. 12, at step 1212, LRF allocation unit 706 determines whether the transition zone is fully cleared. If not, then process 1200 remains in loop 1208 and attempted LRF allocations that would include all or part of the transition zone continue to be blocked at step 1210.

Eventually, any PS or VS threads to which slots in the transition zone had already been allocated finish executing and their LRF resources are freed. At that point, LRF allocation unit 706 changes the value Q stored in register 740 to Q' (step 1214), and process 1200 exits (step 1216). Thereafter, allocation can proceed as described above with reference to FIGS. 8A-8B, using the new value Q' in place of Q.

It should be noted that, as described above, some embodiments of process 800 reset the P_head and P_tail pointers 718, 720 to zero when the PS section 714 is found to be empty. This can help to clear the transition zone faster, e.g., in cases where P_head pointer 718 happened to be in the transition zone when the Shift_Q signal is received. In the case of VS threads, resetting the V_head and V_tail pointers 726, 728 to Q when VS section 716 is found to be empty would be counterproductive if Q is being shifted up; instead, the V_head and V_tail pointers 726, 728 could be reset to the larger of Q and Q'.

In some embodiments, after LRF allocation logic 706 receives the Shift_Q signal in either the "shift up" or "shift down" state, further Shift_Q signals from LRF load balancing control logic 1000 are ignored until such time as the boundary point Q is actually shifted. Further, in some embodiments, after Q is shifted, LRF allocation logic 706 sends a reset signal to control logic 1000 instructing control logic 1000 to reset failure counter 1002 and timer 1008, so that asymmetry measurements going forward will not be affected by an asymmetric use condition that may have persisted while LRF allocation logic 706 was in the process of shifting Q in response to a previous measurement.

It will be appreciated that the load balancing process described herein is illustrative and that variations and modifications are possible. Process steps described as sequential may be executed in parallel, order of steps may be varied, and steps may be modified or combined. In one alternative embodiment, the increment Δ by which the boundary point Q is shifted is variable and can be selected, e.g., based in part on the degree of asymmetric use detected, with more extreme asymmetry resulting in a larger shift.

In some embodiments, upper and lower limits on the boundary point Q are defined, e.g., as configurable system parameters, and Q is constrained to remain within these limits. For instance, LRF allocation logic 706 of FIG. 7A might be configured to ignore any instructions that would shift Q past either limit. In one embodiment, the lower limit is set to P_size so that PS section 714 is always large enough to support at least one PS thread while the upper limit is set to R-V_size, so that VS section 716 is always large enough to support at least one VS thread. Those skilled in the art will appreciate that such limits are not necessary: even if all of LRF 304 is apportioned to one thread type (e.g., PS), if VS threads are repeatedly blocked, an asymmetric use condition will result and the boundary point Q will eventually be shifted down far enough to allow VS threads to run.

In some embodiments, the LRF allocation and load-balancing techniques described herein can be extended to instances where a core 234 concurrently executes more than two types of threads, e.g., VS, PS, and GS threads. Two boundary points can be provided, and each boundary point can be dynamically modified based on asymmetric use between the two thread types that share the boundary point. It should be noted, however, that shifting one boundary point to correct an asymmetry between one pair of thread types may increase asymmetry between another pair, necessitating a shift in another boundary point, and multiple load balancing cycles may be needed before all the boundary points stabilize.

In another embodiment with more than two thread types, two "main" thread types are identified and the LRF is divided between them. Other thread types are treated as "subtypes" of one or the other of the main types. For example, where PS, VS and GS thread types are concurrently supported, the main thread types might be defined as "pixel" and "non-pixel," with VS and GS both being subtypes of the non-pixel type while PS is the only subtype of the pixel type. In one such embodiment, VS and GS allocations are not segregated within the LRF. If the per-thread block sizes are similar between VS and GS types, fragmentation is not significantly increased by allowing the two types of allocations to be intermingled.

In another alternative embodiment, the LRF is not logically divided into sections for different thread types, and blocks allocated to different thread types may be allowed to intermingle (as is the case for CIDs in the embodiments described above). A limit can be set on the number of LRF entries reserved for each thread type, and that limit can be dynamically adjusted in the manner described above. Alternatively, where blocks allocated to different thread types are intermingled, the limit can be treated as a soft limit, similarly to the limits on CIDs described above.

It should also be noted that some embodiments described above limit the frequency with which the boundary point Q can be shifted to not more than once per timeout period. Limiting the frequency of shifts can be particularly useful in embodiments where shifting Q can add significant overhead to the processor. For instance, in some embodiments with multiple processing cores 234 (see FIG. 2), blocking of allocations due to load balancing in one core 234 can create backpressure on the pipeline that prevents subsequent data from reaching other cores 234, not just the core 234 whose boundary is shifted. To the extent that data can be redirected to other cores 234 when one core 234 is blocked due to load balancing, more frequent shifting of Q may be acceptable.

It should also be noted that in some embodiments, the local register file 304 has a two-dimensional structure. For instance, local register file 304 may include a number of banks (e.g., 4, 8, 16, or some other number), allowing data to be read from or written to different banks in LRF 304 in parallel for multiple threads in a SIMD group; the increased LRF bandwidth can improve processor performance. In one such embodiment, each bank has the same number R of entries, with corresponding entries in different banks making up a row in the LRF. Where this is the case, LRF allocation and/or load balancing can be managed by rows rather than by individual entries if desired.

Further Embodiments

Above-described embodiments of the present invention provide resource allocation and/or load balancing in a multi-threaded processor based on thread type of the threads being executed. While the invention has been described with respect to specific embodiments, one skilled in the art will recognize that numerous modifications are possible. For instance, while the invention has been described with reference to specific resources—in particular, local register file space and thread (or thread group) identifiers—similar techniques can be used to manage other resources that are allocated on a per-thread basis, including but not limited to global register file space, input buffer and/or output buffer space, space in a data cache and/or instruction cache, and so on. In some embodiments, some resources might be used by only one thread type; for instance, in some embodiments, core 234 includes a dedicated pixel input buffer that is used only for PS threads. Such resources need not be apportioned among thread types.

In some embodiments, a resource can be apportioned among thread types without dynamic load balancing. For instance, in the embodiments described above, the boundary point Q in LRF allocation or the limits P_max and V_max could be configured at application startup and not modified during application execution.

Additionally, while the embodiments described above may make reference to a single core interface that manages a single core, it is to be understood that processor embodiments of the invention may include one or more core interfaces, each of which can manage one or more cores. Resource allocation and load balancing can be performed separately by each core interface for each core that it manages. For instance, if a core interface manages one core that executes PS and VS threads and another core that executes PS and GS threads, the load balance points for various resources in these two cores might be the same or different.

It is also noted that the embodiments described above make reference to pixel shader threads, vertex shader threads and other terminology specific to graphics processing applications. The present invention, however, is not limited to graphics applications or graphics processors; thread-type-based resource allocation and/or bad balancing may advantageously be employed in any multithreaded processor in which resources are allocated among threads that can be classified into two or more thread types, where multiple threads of each type are expected to be processed concurrently.

Thus, although the invention has been described with respect to specific embodiments, it will be appreciated that the invention is intended to cover all modifications and equivalents within the scope of the following claims.

What is claimed is:

1. A method for allocating a shared resource in a multithreaded processor that concurrently executes a plurality of threads, each thread being of one of a plurality of thread types, the method comprising:
    reserving a first amount and a second amount of a shared resource, respectively, for allocation to threads of a first one and a second one of the plurality of thread types, wherein the first amount and the second amount are reserved by dividing the shared resource such that the first amount is reserved for allocation to threads of the first thread type and a remainder of the shared resource is reserved as the second amount for allocation to threads of the second thread type;
    tracking, for each of the first and second thread types, an amount of the shared resource currently allocated to threads of that type;
    receiving a request to allocate a first target amount of the shared resource to a first new thread, the first new thread being of the first thread type;
    determining, based at least in part on the first reserved amount and the amount of the shared resource currently allocated to threads of the first thread type, whether the first target amount of the shared resource is available for allocation to the first new thread; and
    in the event that the first target amount of the shared resource is available, allocating the first target amount of the shared resource to the first new thread,
    wherein the act of reserving the first amount and the second amount of the shared resource includes:
    partitioning the shared resource into at least a first section associated with the first thread type and a second section associated with the second thread type; and
    wherein the act of determining whether the first target amount of the shared resource is available for allocation to the first new thread includes determining whether the first target amount of the shared resource is available within the first section, and
    wherein the act of allocating the first target amount includes allocating the first target amount of the shared resource from the first section in a circular FIFO fashion.

2. The method of claim 1 further comprising:
    receiving a request to allocate a second target amount of the shared resource to a second new thread, the second new thread being of the second thread type;
    determining, based at least in part on the second reserved amount and the amount of the shared resource currently allocated to threads of the second thread type, whether the second target amount of the shared resource is available for allocation to the second new thread; and
    in the event that the second target amount of the shared resource is available, allocating the second target amount of the shared resource to the second new thread.

3. The method of claim 2 wherein the first target amount and the second target amount are different amounts.

4. The method of claim 1 wherein the shared resource is a pool of context identifiers, wherein a different context identifier is assigned to each of a plurality of concurrently active threads.

5. The method of claim 1 wherein the shared resource is a pool of entries in a local register file usable as thread-specific scratch space during execution of a plurality of concurrently active threads.

6. The method of claim 1 wherein a pixel shader thread is a thread of the first thread type.

7. The method of claim 6 wherein a vertex shader thread is a thread of the second thread type.

8. The method of claim 7 wherein a geometry shader thread is also a thread of the second thread type.

9. The method of claim 1 wherein the act of determining whether the first target amount of the shared resource is available includes determining whether increasing the amount of the shared resource currently allocated to threads of the first thread type by the first target amount would result in the currently allocated amount exceeding the first reserved amount.

10. A multithreaded processor comprising:
    a core adapted to execute a plurality of threads concurrently, each thread having one of a plurality of thread types, wherein each concurrently executing thread is allocated a portion of a shared resource;
    a resource allocation table adapted to store allocation information for the shared resource, the allocation information including, for each portion of the shared resource that is currently allocated to a thread, information identifying the thread type of the thread to which the portion is allocated; and
    resource allocation logic coupled to the resource allocation table and adapted to determine whether a target amount of the shared resource is available for allocation to a new thread of a first thread type, and if the target amount of the shared resource is available, then allocating the target amount of the shared resource to the new thread,
    wherein the determination is based at least in part on the allocation information in the resource allocation table and apportionment information specifying an amount of the shared resource that is reserved for threads of the first thread type,
    wherein the apportionment information is generated by dividing the shared resource into a first amount and a second amount, such that the first amount may be allocated to threads of the first thread type and a remainder of the shared resource may be allocated as the second amount to the threads of a second thread type,
    wherein specifying an amount of the shared resource that is reserved for threads of the first thread type includes:
    partitioning the shared resource into at least a first section associated with the first thread type and a second section associated with the second thread type; and
    wherein determining whether the target amount of the shared resource is available for allocation to the new thread includes determining whether the target amount of the shared resource is available within the first section, and
    where allocating the target amount includes allocating the target amount of the shared resource from the first section in a circular FIFO fashion.

11. The multithreaded processor of claim 10 wherein the apportionment information specifies an upper limit on an amount of the shared resource that is available to threads of the first thread type.

12. The multithreaded processor of claim 11 wherein the resource allocation logic includes:
- a counter adapted to generate a count of threads of a first thread type for which a portion of the shared resource is currently allocated;
- a comparison circuit coupled to the counter and adapted to compare the count generated by the counter to the upper limit; and
- a decision logic circuit adapted to determine, based on the comparison, whether an additional allocation to a thread of the first thread type would result in the count exceeding the upper limit.

13. The multithreaded processor of claim 12 wherein the decision logic circuit is further adapted to make an allocation to a new thread of the first thread type only in the event that an additional allocation to a thread of the first thread type would not result in the count exceeding the upper limit.

14. The multithreaded processor of claim 10 wherein the apportionment information includes boundary information dividing the shared resource into at least a first section reserved for threads of the first thread type and a second section reserved for threads of a second one of the thread types.

15. The multithreaded processor of claim 14 wherein the resource allocation logic is further adapted to determine whether to make an allocation for a new thread of the first thread type based on whether an amount of the shared resource required by the new thread is available in the first section of the shared resource.

16. The multithreaded processor of claim 15 wherein the resource allocation logic is further adapted to make an allocation only in the event that the amount of the shared resource required by the new thread is available in the first section of the shared resource.

17. The multithreaded processor of claim 10 wherein the shared resource is a pool of entries in a local register file in the core, the local register file entries being usable to store intermediate results generated during execution of the threads.

18. The multithreaded processor of claim 10 wherein the shared resource is a pool of context identifiers used by the core to identify which of the concurrently executing threads is being executed at a particular time.

\* \* \* \* \*